(12) United States Patent
Park et al.

(10) Patent No.: US 9,857,631 B2
(45) Date of Patent: Jan. 2, 2018

(54) REFLECTING PLATE, BACKLIGHT UNIT, AND DISPLAY DEVICE

(71) Applicant: SAMSUNG ELECTRONICS CO., LTD., Suwon-si, Gyeonggi-do (KR)

(72) Inventors: Chun Soon Park, Suwon-si (KR); Young Chol Lee, Hwaseong-si (KR); Seung Hun Chae, Suwon-si (KR); Sung Ho Choi, Suwon-si (KR); Hyung Jin Ha, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/926,150

(22) Filed: Oct. 29, 2015

(65) Prior Publication Data

US 2017/0017121 A1    Jan. 19, 2017

(30) Foreign Application Priority Data

Jul. 13, 2015    (KR) ........................ 10-2015-0099282

(51) Int. Cl.
   *G02F 1/1335*    (2006.01)
   *F21V 7/05*    (2006.01)
   *F21V 9/08*    (2006.01)

(52) U.S. Cl.
   CPC .......... *G02F 1/133609* (2013.01); *F21V 7/05* (2013.01); *F21V 9/08* (2013.01); *G02F 1/133603* (2013.01); *G02F 1/133605* (2013.01); *G02F 2001/133614* (2013.01); *G02F 2202/36* (2013.01)

(58) Field of Classification Search
   CPC ......... G02F 1/133609; G02F 1/133603; G02F 1/133605; G02F 2001/133614; G02F 2202/36; F21V 9/08; F21V 7/05
   See application file for complete search history.

(56) References Cited

U.S. PATENT DOCUMENTS

2006/0055850 A1    3/2006 Murata et al.
2009/0002620 A1    1/2009 Yamashita et al.
(Continued)

FOREIGN PATENT DOCUMENTS

CN    104344291 A    2/2015
EP    2 216 585    8/2010
(Continued)

OTHER PUBLICATIONS

Jeyong-Min Seo, Korean Patent Application Publication 10-2007-0079259, Aug. 2007, machine translation.*
(Continued)

*Primary Examiner* — Tracie Y Green
(74) *Attorney, Agent, or Firm* — Nixon & Vanderhye P.C.

(57) ABSTRACT

Disclosed herein are a reflecting plate, a backlight unit, and a display device using the backlight unit, and the display device includes one or more light sources; a reflecting plate to which light radiated from the one or more light sources is incident and having a reflecting surface reflecting the incident light; one or more selective light absorbing parts disposed on the reflecting surface and configured to selectively absorb a portion of the incident light; and a quantum dot sheet into which at least one of light emitted without being absorbed by the selective light absorbing part and light radiated from the light source is incident.

24 Claims, 20 Drawing Sheets

(56) References Cited

U.S. PATENT DOCUMENTS

2013/0278134 A1    10/2013   Ko et al.
2013/0335677 A1    12/2013   You
2015/0029439 A1     1/2015   Kim et al.
2015/0036317 A1     2/2015   Yamamoto et al.

FOREIGN PATENT DOCUMENTS

| EP | 2 759 856 | 7/2014 |
|---|---|---|
| KR | 10-2007-0079259 | 8/2007 |
| KR | 10-2012-0088273 | 8/2012 |
| KR | 10-2014-0108745 | 9/2014 |
| WO | WO 2016/089102 | 6/2016 |

OTHER PUBLICATIONS

Mun-Suk Gang, Korean Patent Application 2012-0088273, Jan. 2011, machine translation.*
Extended European Search Report dated Nov. 21, 2016 in counterpart European Patent Application No. 15197073.8.
Search Report dated May 25, 2016 in counterpart International Application No. PCT/KR2015/011991.
EP Examination Report for EP Application No. 15197073.8 dated Sep. 29, 2017.

* cited by examiner

REFLECTING PLATE, BACKLIGHT UNIT, AND DISPLAY DEVICE

CROSS-REFERENCE TO RELATED APPLICATION

This application is based on and claims priority under 35 U.S.C. §119 to Korean Patent Application No. 10-2015-0099282, filed on Jul. 13, 2015 in the Korean Intellectual Property Office, the disclosure of which is incorporated by reference herein in its entirety.

BACKGROUND

1. Field

Examples of the disclosure relate to a reflecting plate, a backlight unit, and a display device using the backlight unit.

2. Description of Related Art

Display devices are a kind of output device configured to change acquired or stored electric information into visual information and display it to a user, and are used in various fields such as homes, workplaces, or the like.

The display devices include monitor devices connected to personal computers, server computers, or the like, portable computer devices, navigation terminal devices, general television devices, Internet protocol television (IPTV) devices, portable terminal devices such as smartphones, tablet personal computers, personal digital assistant (PDA) devices, cellular phones, or the like, various display devices used to play images such as advertisements or movies in industrial fields, audio/video systems of other various kinds, or the like.

The display devices are capable of displaying still images or moving images using display units of various kinds. The above display units can use a cathode ray tube, light emitting diodes, organic light emitting diodes, active matrix organic light emitting diodes, liquid crystals, electric papers, or the like.

SUMMARY

Therefore, it is an aspect of the disclosure to provide a reflecting plate, a backlight unit, and a display device capable of removing, reducing or minimizing mura generated on a display screen in the case of providing light to a display panel using a quantum dot (QD) sheet.

Additional aspects of the disclosure will be set forth in part in the description which follows and, in part, will be apparent from the description.

In accordance with one example of the disclosure, the display device includes one or more light sources; a reflecting plate on which light radiated from the one or more light sources is incident and having a reflecting surface reflecting the incident light; one or more selective light absorbing parts disposed on the reflecting surface and configured to selectively absorb a portion of the incident light; and a quantum dot sheet into which at least one of a light emitted without being absorbed by the selective light absorbing part and the light radiated from the light source is incident.

The one or more selective light absorbing parts may, for example, comprise one or more compounds, and the one or more compounds may absorb yellow-based light or yellowish red-based light.

The one or more selective light absorbing parts may include tetra-aza-porphyrin (TAP).

The one or more selective light absorbing parts may absorb relatively more light in a certain wavelength range, and the certain wavelength range may be in a range from 570 nm to 610 nm.

The one or more selective light absorbing parts may be installed on the reflecting surface of the reflecting plate by, for example, coating, printing, or attaching onto the reflecting surface of the reflecting plate.

The one or more selective light absorbing parts may, for example, be installed on all or a portion of the reflecting surface of the reflecting plate.

The one or more selective light absorbing parts may, for example, be arranged on the reflecting surface of the reflecting plate in a predetermined pattern.

The one or more selective light absorbing parts may, for example, be installed adjacent to the one or more light sources.

The one or more selective light absorbing parts may, for example, surround the one or more light sources and may be disposed on the reflecting surface of the reflecting plate.

The one or more selective light absorbing parts may, for example, have a circular band shape or an elliptical band shape, and the one or more light sources may be disposed on an inner side thereof.

The one or more selective light absorbing parts may, for example, be disposed between the one or more light sources.

The one or more selective light absorbing parts may, for example, have a straight band shape or a curved band shape and may be disposed between the one or more light sources.

The selective light absorbing part may, for example, include one or more first selective light absorbing parts having a straight band shape or a curved band shape; and one or more second selective light absorbing parts having a straight band shape or a curved band shape.

The one or more first selective light absorbing parts and the one or more second selective light absorbing parts may, for example, be disposed to cross each other on the reflecting surface of the reflecting plate.

The one or more selective light absorbing parts may, for example, be arranged on the reflecting surface of the reflecting plate in a straight line or in a zigzag shape.

The one or more selective light absorbing parts may, for example, have a circular shape, an elliptical shape, a waterdrop shape, or a polygonal shape.

The reflecting plate may, for example, include one or more through-holes into which the one or more light sources are inserted, wherein the one or more light sources are exposed.

The one or more light sources may, for example, include a blue light emitting diode configured to emit blue-based light.

The quantum dot sheet may, for example, change a color of a portion of the incident light and emit the portion of the incident light whose color has been changed, and may not change a color of a remaining portion and emit the remaining portion whose color has not been changed.

The quantum dot sheet may mix and emit the light having a changed color and the light having an unchanged color to emit white-based light.

The display device may further include a display panel on which the light emitted from the quantum dot sheet is incident, wherein the display panel may generate an image using the incident light.

In accordance with another example of the disclosure, a reflecting plate includes a reflecting surface on which light is incident; and one or more selective light absorbing parts disposed on the reflecting surface, the one or more selective light absorbing parts selectively absorbing a portion of the incident light.

The one or more selective light absorbing parts may, for example, comprise one or more compounds, wherein the one or more compounds may absorb yellow-based light or yellowish red-based light.

The one or more selective light absorbing parts may include TAP.

In accordance with yet another example of the disclosure, a backlight unit includes one or more light sources; a reflecting plate on which light radiated from the one or more light sources is incident and having a reflecting surface reflecting the incident light; one or more selective light absorbing parts disposed on the reflecting surface and configured to selectively absorb a portion of the incident light; and a quantum dot sheet including one surface into which at least one of light emitted without being absorbed by the selective light absorbing part and light radiated from the light source is incident, and configured to emit light of a predetermined color based on the incident light.

The one or more selective light absorbing parts may, for example, comprise one or more compounds, wherein the one or more compounds may absorb yellow-based light or yellowish red-based light.

The one or more selective light absorbing parts may include TAP.

BRIEF DESCRIPTION OF THE DRAWINGS

These and/or other aspects of the invention will become apparent and more readily appreciated from the following detailed description, taken in conjunction with the accompanying drawings in which like reference numerals refer to like elements, and wherein.

DETAILED DESCRIPTION

Hereinafter, various examples of a reflecting plate, a backlight unit, and a display device will be described with reference to the accompanying FIGS. 1 to 20.

Figure 1:
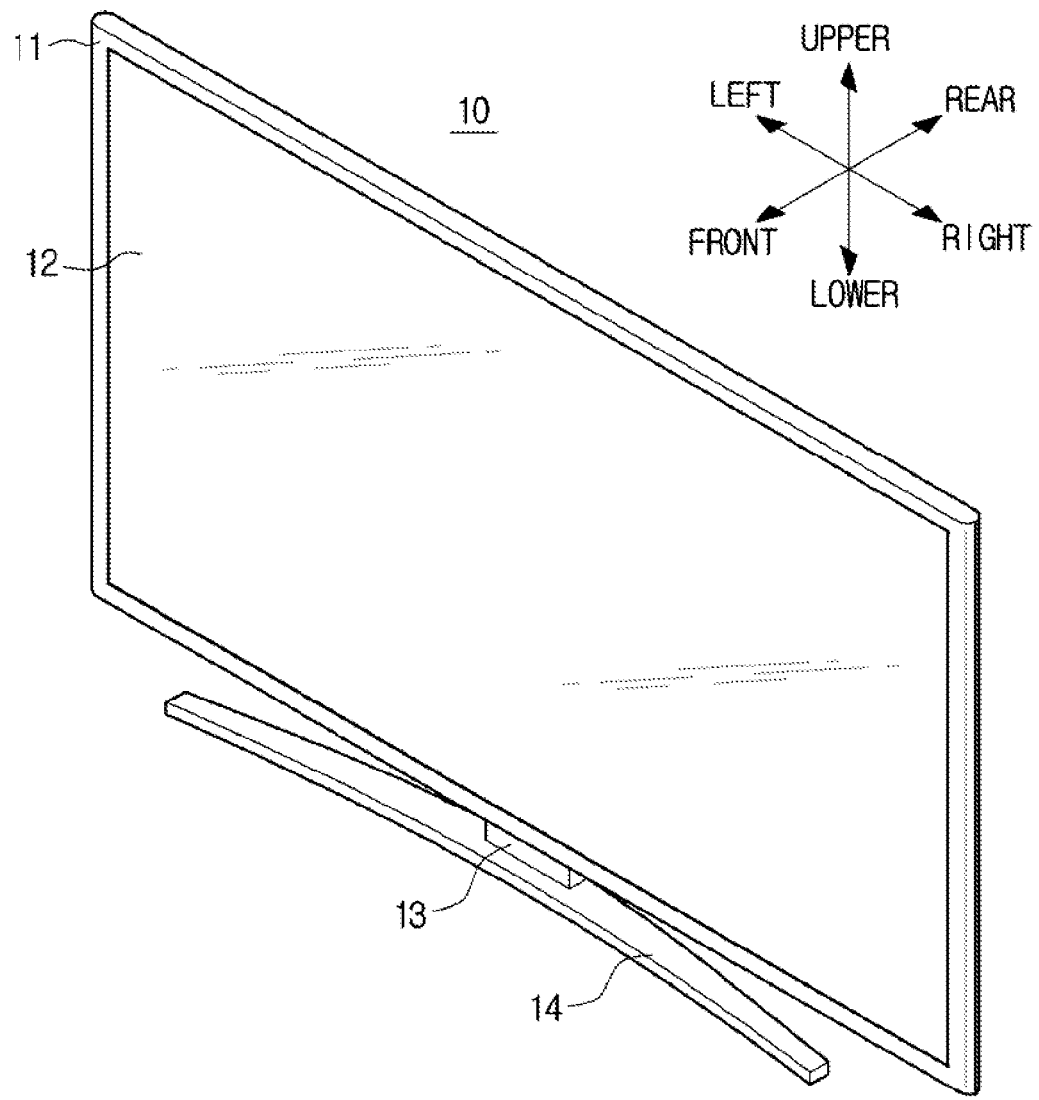
FIG. 1 is a perspective view illustrating an example exterior of a display device.

FIG. 1 is a perspective view illustrating an exterior of an example display device. Hereinafter, for convenience of description, based on an external housing 11, a direction in which an image display part 12 is disposed is referred to as a forward direction, and a direction opposite the forward direction is referred to as a rearward direction, and a direction in which a support 13 and a leg 14 are disposed is referred to as a downward direction, and an opposite direction to the downward direction is referred to as an upward direction. Also, a right side of a segment links from the forward direction to the rearward direction is referred to as a rightward direction, and an opposite direction to the rightward direction is referred to as a leftward direction.

As shown in FIG. 1, the display device 10 may, in an exterior view, includes, for example, an external housing 11, an image display part 12, a support 13, and a leg 14.

The external housing 11 may form an exterior of the display device 10, and components which support the display device 10 for displaying various types of images or performing various operations may be included therein. The external housing 11 may, for example, include a plurality of housings, for example, formed by a combination of a front housing 101 (shown in FIG. 3) and a rear housing 102 (shown in FIG. 3), or may be integrally formed. A middle housing 103 (shown in FIG. 3), or the like may be further provided inside the external housing 11.

The external housing 11, for example, may be connected to the support 13 and the leg 14 and mounted on an indoor or outdoor bottom surface, or may be attached to an indoor or outdoor wall using an additional wall mount, etc.

Various types of components such as a display panel 18 (shown in FIG. 2) or 110 (shown in FIG. 3) and a backlight unit 17 (shown in FIG. 2) or 120 (shown in FIG. 3) are provided in the external housing 11, and the display device 10 may display an image to the outside based on an operation of the display panel 18 or 110 and the backlight unit 17 or 120. The display panel 18 or 110 and the backlight unit 17 or 120 will be described later.

The image display part 12 may be mounted on a front surface of the external housing 11, and display various types of images to the outside. The image display part 12 may display one or more of a still image and a moving image. The image display part 12 may be realized using the display panel 18 or 110. In one example, the image display part 12 may further include an additional component such as a touch screen panel, or the like.

The support 13 includes one end mounted under or on a rear surface of the external housing 11 and the other end coupled with the leg 14. In this case, the support 13, based on a selection of a designer, may be mounted on the external housing 11 so that the support 13 is attached to the external housing 11 or is separable therefrom. The support 13 supports the external housing 11 and may connect the external housing 11 to the leg 14. The support 13, based on the selection of the designer, may have various shapes. The support 13 may be omitted if necessary.

The leg 14 is connected to the other end of the support 13, and thus, the external housing 11 may be securely mounted on the bottom surface. The leg 14, based on the selection of the designer, may be provided to be connected to the support 13 or to be separable from the support 13. The leg 14 may be directly mounted on the external housing 11 without the support 13. The leg 14 may be omitted.

Figure 2:
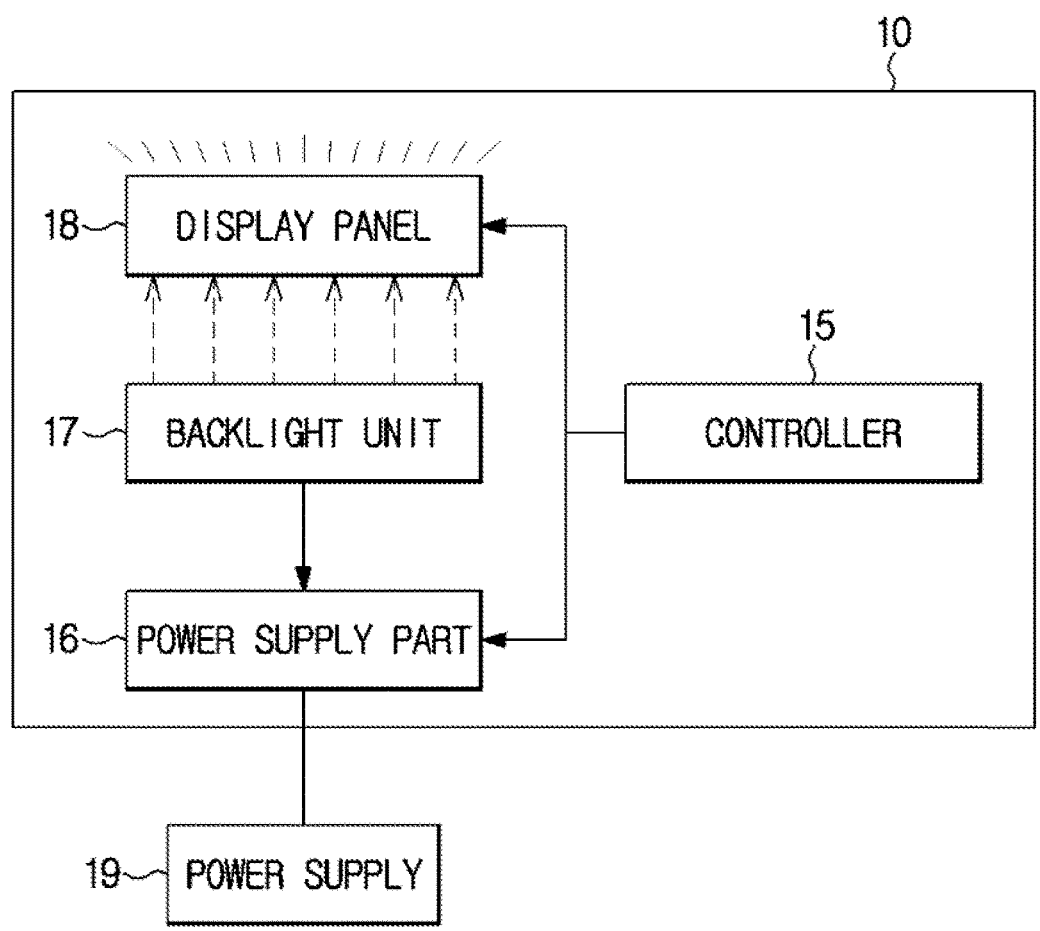
FIG. 2 is a block diagram illustrating an example display device.

FIG. 2 is a bock diagram illustrating an example display device.

As shown in FIG. 2, the display device 10, according to the example, may include a controller 15, a power supply part 16, a backlight unit 17, and a display panel 18.

The controller 15 is configured to control various types of components such as the power supply part 16, the display panel 18 in the display device 10, or the like, and thus, the display panel 18 displays a predetermined still image or moving image. The controller 15 may be realized by one or more processors, and the processor may be realized using one or more semiconductor chips and various types of components configured to operate the semiconductor chips.

In one example, the display device 10 may further include a storage device (not shown) configured to store overall data in order to support the operation of the controller. The storage device may store overall data related to the image to be displayed on the display device 10. The storage device may be realized by various data storage media including semiconductor storage devices such as a RAM or a ROM, magnetic disk storage devices such as a hard disk, or the like.

The power supply part 16 may supply required power to the components disposed in the display device 10. For example, the power supply part 16 may supply electric energy required for outputting a predetermined image to the backlight unit 17, the display panel 18, or the like. In one example, the power supply part 16 may, for example, be electrically connected to an external commercial power supply 19, and rectify an alternating current (AC) power from the commercial power supply 19 into a direct current (DC) power required for operating the display device 10, and then, supply the DC power to each component disposed in the display device 10. The power supply part 16 may change a voltage of the commercial power supply 19 to a required level, or perform an operation of removing noise included in the DC power source. In one example, the power supply part 16 may include a battery capable of storing electric energy, and when electric energy is supplied from the outside, the battery may store the electric energy supplied from the outside, and supply power to each component disposed in the display device 10 if necessary.

The backlight unit 17 may generate light based on applied electric energy, and project the generated light in a direction toward the display panel 18. The backlight unit 17 may be realized using a light emitting unit such as a light emitting diode configured to emit light, and may further include, for example, a diffusion sheet or a light guide plate, and thus, the emitted light is sufficiently incident onto an entire surface of the display panel 18, and also, may further include a transforming unit configured to change the light emitted from the light emitting diode into white-based light, for example, a quantum dot sheet, or the like. When the display panel 18 is a self emissive type such as an organic light emitting diode (OLED) display panel, the backlight unit 17 may be omitted. A detailed description of the backlight unit 17 will be described below.

The display panel 18 may generate an image using the incident light from the backlight unit 17. In one example, the display panel 18 may control light emitted toward the outside using liquid crystals. Also, the display panel 18 may further use a color forming part 150 (shown in FIG. 3) configured to change the incident light of a predetermined color into light of a particular color, and emit the light of the particular color. Also, the display panel 18 may generate and emit light by itself, and, in this case, the backlight unit 17 may be omitted. In one example, when the display panel 18 is a self emissive type, the display panel 18 may use an organic light emitting diode or an active matrix organic light emitting diode. The detailed description of the display panel 18 will be described below.

Figure 3:
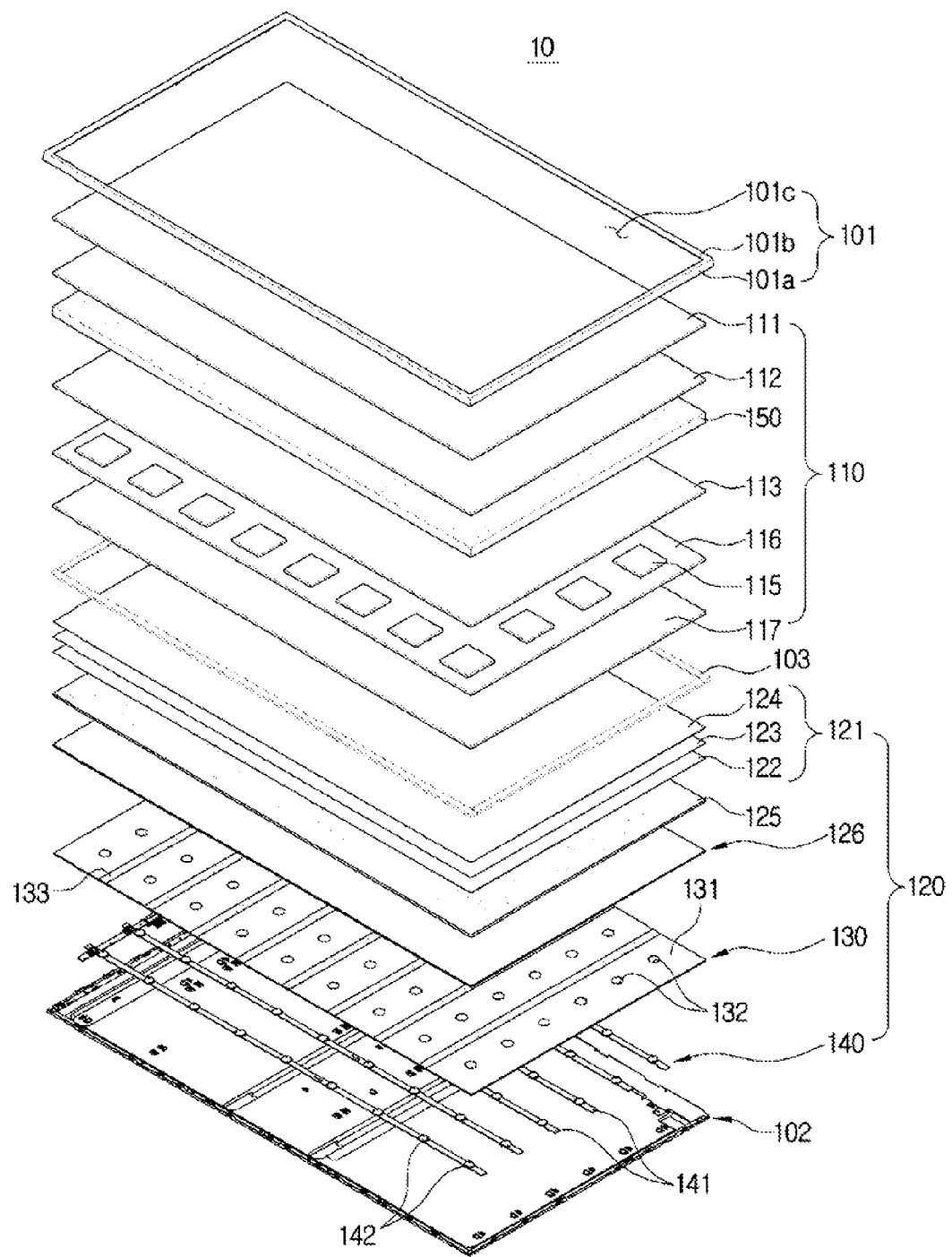
FIG. 3 is an exploded perspective view illustrating an example display device.
Figure 4:
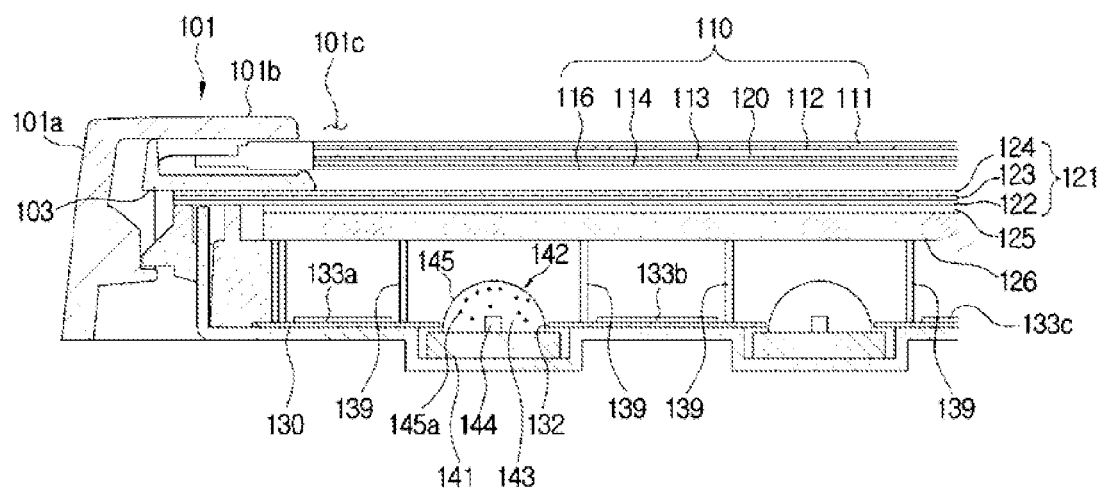
FIG. 4 is a side cross-sectional view illustrating an example display device.

FIG. 3 is an exploded perspective view illustrating an example display device, and FIG. 4 is a side cross-sectional view illustrating the example display device. In FIGS. 3 and 4, an upward direction of the drawings is the same as the forward direction of FIG. 1.

According to a first example, the display device 10, as shown in FIGS. 3 and 4, may include housings 101 and 102 forming the exterior thereof, a display panel 110 configured to generate an image, and a backlight unit (BLU) 120 configured to supply light to the panel.

In one example, the housings 101 and 102 may include a front housing 101 disposed in a forward direction and a rear housing 102 disposed in a rearward direction.

The front housing 101 is disposed on a front most surface of the display device 10, and forms exteriors of a front surface and a side surface of the display device 10. The front housing 101 is combined with the rear housing 102 to contain and fix the components of the display device 10 to the display device 10, thereby protecting the components from external impacts.

The front housing 101 may include a front part 101b forming a bezel and a side part 101a extending from an end portion of the front part 101b in a direction toward the rear housing 102. An opening 101c is formed in the front of the front housing 101. The side part 101a is combined with the rear housing 102, and thus, the front housing 101 is combined with the rear housing 102. The side part 101a may fix the various components to the inside of the display device 10, and protect the components included in the display device 10 from an impact transmitted in a side direction. The front part 101b may protrude in a direction toward the opening 101c, and fix various types of components such as a second polarizing filter 111, a second substrate 112, a color forming part 150, or the like, and prevent separation of related components toward the outside, or partial exposure thereof. The opening 101c may be provided in a direction toward an inner side of the front part 101b, and the image generated by the display panel 110 may be displayed to the outside therethrough.

The rear housing 102 is disposed in the rearmost direction of the display device 10, and forms an exterior of the rear surface of the display device 10. The rear housing 102 is combined with the front housing 101 so that the various types of components of the display device 10 are included in the display device 10. In one example, the front housing 101 and the rear housing 102 may be integrally formed. Components, such as a light emitting part 140, a reflecting plate 130, or the like, may be mounted on the rear housing 102.

The backlight unit 120 may include an optical plate 121, a quantum dot sheet 125, a diffusion plate 126, the reflecting plate 130, and the light emitting part 140.

The light emitting part 140 may include a light source 142 configured to generate light, and a third substrate 141 on which the light source 142 is mounted.

A plurality of the light sources 142 may be mounted on the third substrate 141 in a predetermined pattern. For example, the plurality of light sources 142 may be mounted in a straight line or in various shapes on the third substrate 141. However, the arrangement pattern of the light sources 142 is not limited thereto, the light sources 142 may be arranged and mounted on the third substrate 141 in various patterns considered by a designer. A driving power line configured to supply driving power to the light source 142, or the like may be formed on the third substrate 141, and thus a signal cable (not shown) and a backlight driving circuit (not shown) may be connected. The third substrate 141 may be manufactured using various materials such as a synthetic resin, etc., and may include a transparent material such as polymethylmethacril resin, a glass plate, or the like.

When electric power is supplied from the outside, the light source 142 may generate light of a predetermined color, and emit the light in various directions, and may be embodied using a light bulb, a halogen lamp, a fluorescent lamp, a sodium lamp, a mercury lamp, a fluorescent mercury lamp, a xenon lamp, an archi illumination lamp, a neon tube lamp, an electroluminescent (EL) lamp, a light emitting diode lamp, or the like. Other than the above, various illumination devices considered by a designer may be adopted as the light source 142.

In one example, the light source 142 may emit blue-based light based on an applied power source. The blue-based light has a wavelength in a range of 400 nm to 500 nm, and is optically viewed as blue light. When the blue-based light is emitted, the light source 142 may be realized using a blue light emitting diode.

The light source 142 may include a light emitting unit 144 and a transparent body 145.

The light emitting unit 144 may be provided in the transparent body 145, and may emit light of a predetermined color, for example blue-based light, by applying outside power.

The light emitting unit 144, in particular, may include a light emitting chip (not shown) which is realized using a positive electrode frame (not shown) and a negative electrode frame (not shown) through which a current flows by applying the power from the outside and a PN coupled semiconductor, and generates light by electrical coupling between the positive electrode frame and the negative electrode frame, and a reflecting part (not shown) configured to reflect the light emitted from the light emitting chip to proceed the light in a predetermined direction.

The light emitting chip may emit blue-based light, and in this case, the light emitting chip may, for example, be realized using gallium nitride (GaN), aluminum gallium nitride (AlGaN), indium gallium nitrogen (InGaN), or the like.

The transparent body 145 includes the light emitting unit 144 therein, and emits the light generated from the light emitting unit 144 toward the outside. The transparent body 145 may, for example, be realized using a synthetic resin such as an acrylic resin, a material such as glass through which light is passed, and may be manufactured in various shapes based on a selection of a designer. For example, as shown in FIG. 4, the transparent body 145 may be realized in a semispherical shape. In one example, various particles 145a configured to change a color of the light emitted from the light emitting unit 144 or diffuse the light may be further provided in the transparent body 145.

In one example, the light source 142, as shown in FIGS. 3 and 4, may be provided on a rear surface of the display device 10 to face the forward direction (a direct-lit backlight unit), or in another example, may be arranged on a side surface of an additionally installed light guide plate (not shown) along one row, and thus, the emitted light may be provided from a side surface toward a central direction of the display device. In this case, the light source 142 may be provided, and thus, the emitted light is incident onto the light guide plate (an edge-lit backlight unit). In this case, the light emitted from the light source 143 is incident onto a side surface of the light guide plate, and the light is substantially completely reflected and transmitted by the light guide plate, and emitted in a direction toward the display panel 110.

Figure 5:
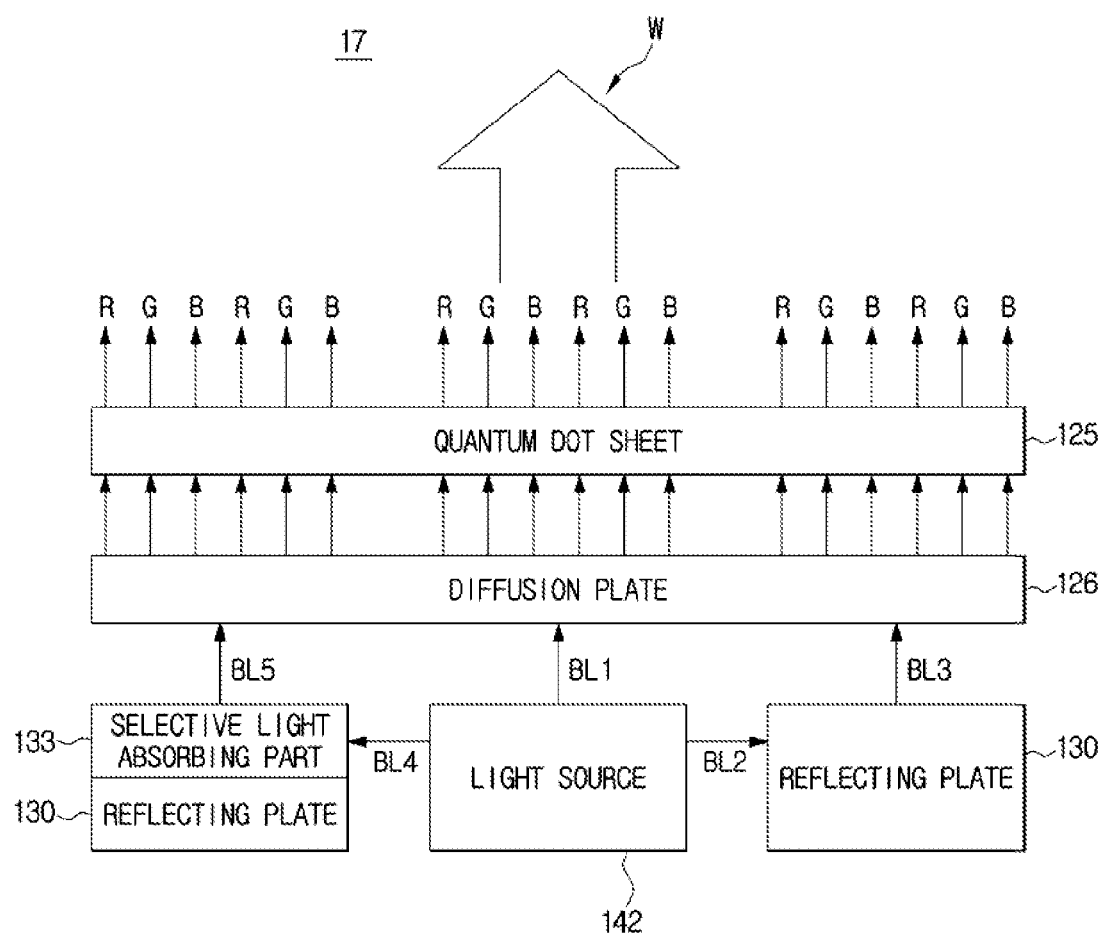
FIG. 5 is a view illustrating an example backlight unit of an example display device.

FIG. 5 is a view illustrating an example backlight unit of a display device.

Referring to FIG. 5, lights BL2 and BL4 generated from a light source 142 may be directly incident in a forward direction (BL1), or incident in the forward direction after being reflected from a reflecting plate 130 (BL3), or reflected from the reflecting plate 130 after passing through a selective light absorbing part 133 provided on the reflecting plate 130 and incident in the forward direction (BL5). The lights BL1, BL3, and BL5 incident in the forward direction may pass through a diffusion plate 126 and a quantum dot sheet 125, and then, may be incident onto a display panel 110.

In one example, the lights BL2 and BL4 generated from the light source 142 may be incident onto a light guide plate, and reflected in the light guide plate, and then, may be incident in the forward direction.

In one example, the reflecting plate 130 may reflect the light progressing in a rearward direction or a side direction after being emitted from the light source 142 in the forward direction or a direction similar thereto. The reflecting plate 130 may be installed on a rear housing 102.

Also, the reflecting plate 130 may reflect light progressing in the rearward direction or a direction similar thereto after being incident into the light guide plate in the forward direction or a direction similar thereto. In this case, the reflecting plate 130 may be disposed on a rear surface of the light guide plate, and in particular, the reflection surface of the reflecting plate 130 may be installed to be in contact with or separated from the rear surface of the light guide plate.

The reflecting plate 130 may, for example, be manufactured using synthetic resins such as polycarbonate (PC), polyethylene terephthalate (PET), or the like, and may be manufactured using various metallic materials. Other than the above, the reflecting plate 130 may be manufactured using various materials which may be considered by a designer.

In one example, the reflecting plate 130 may include a reflecting plate main body 131 on which a reflecting surface is provided, one or more through-holes 132 (see, e.g., FIG. 3), and a selective light absorbing part 133.

When the light emitted from the light source 142 is incident onto the reflecting plate main body 131, the reflecting plate main body 131 reflects the incident light in the forward direction or the similar direction thereto, that is, a direction toward the display panel 110. The reflecting surface is provided on one surface in the forward direction of the reflecting plate main body 131. A third substrate 141 on which the light source 142 is installed may be disposed on one surface in the rearward direction of the reflecting plate main body 131.

The through-holes 132 are provided to pass from one surface of the reflecting plate main body 131 through the other surface thereof so that the light source 142 may be inserted therethrough and installed. The through-hole 132 may be provided on the reflecting plate 130 corresponding to the pattern at which the light source 142 is disposed on the third substrate 141. When the light source 142 is directly installed on the reflecting surface of the reflecting plate main body 131 of the reflecting plate 130, or the light source 142 is installed on a substrate having an additional transparent material, the through-hole 132 may be omitted in one example.

The selective light absorbing part 133 may be provided on a reflecting surface of the reflecting plate main body 131. The selective light absorbing part 133 may selectively absorb a portion of the light incident onto the reflecting surface of the reflecting plate main body 131. The light partially absorbed by the selective light absorbing part 133 is reflected from the reflecting plate main body 131 toward the forward direction or the similar direction thereof.

The selective light absorbing part 133 may decrease color mura caused, for example, by an irregular amount of light reflected from the reflecting plate main body 131 and displayed on a screen of the display device 10. The mura represents an unintentional spot mark generated on a screen displayed by the display device 10. The color mura represents an area in which a color temperature difference occurs compared with an originally desired color on the screen displayed by the display device 10. When a blue light emitting diode is used as the light source 142, a color mura similar to a bluish spot may be generated on a white screen of the display device 10. Since the selective light absorbing part 133 absorbs only light of a predetermined wavelength from the light incident onto the reflecting surface of the selective light absorbing part 133, the generation of the above color mura may be reduced and/or prevented.

The selective light absorbing part 133 may, for example, absorb only light having a predetermined wavelength range from the incident light, and, for example, the selective light absorbing part 133 may absorb more light having a wavelength of 570 nm to 610 nm than light having other wavelengths. In this case, the selective light absorbing part 133 may absorb light having a color of yellow group, yellowish red group, orange group, or the like. The selective light absorbing part 133 may be designed to absorb more light having a wavelength of 585 nm to 595 nm than light having other wavelengths.

In one e, the selective light absorbing part 133 may be realized using tetra-aza-porphyrin (TAP) or porphyrazine.

The selective light absorbing part 133 may be realized using a film manufactured using TAP, and the film may be attached to the reflecting plate main body 131, and thus, may be provided on the reflecting plate main body 131. Also, the selective light absorbing part 133 may be provided on the reflecting plate main body 131 by printing or coating a colorant or pigment including TAP on the reflecting plate main body 131. Other than the above, the selective light absorbing part 133 may be formed on the reflecting plate main body 131 using various methods considered by a designer.

A detailed description of the reflecting plate 130 and the selective light absorbing part 133 will be described below.

Referring to FIGS. 3 to 5, the optical plate 121, the quantum dot sheet 125, and the diffusion plate 126 may be provided in a forward direction of the reflecting plate 130.

The diffusion plate 126 performs an operation of uniformly diffusing irregular light emitted from the light source 142, and an operation of supporting various types of optical plates 121. The diffusion plate 126 may be used instead of a light guide plate in a direct-lit backlight unit.

In particular, the diffusing plate 126 substantially uniformly diffuses the incident light, and emits the diffused light in the forward direction. For example, the diffusion plate 126 may diffuse at least one of a directly incident light after being emitted from the light source 142, incident light after being reflected from the reflecting plate 130, and reflected and incident light after light having some wavelengths is absorbed by the selective light absorbing part 133, and the light may be substantially uniformly diffused and incident onto all surfaces of the quantum dot sheet 125. The light emitted from the light source 142, reflected from the reflecting plate 130, or of which light having specific wavelengths is absorbed by the selective light absorbing part 133 is incident onto a rear surface of the diffusion plate 126, and passes through the diffusion plate 126 and is diffused, and then, emitted through the front surface of the diffusion plate 126. The light having passed through the diffusion plate 126 is incident onto the quantum dot sheet 125.

As shown in FIG. 4, the diffusion plate 126 may be separated from the light source 142 and the reflecting plate 130. One or more supports 139 configured to support the diffusion plate 126 are provided between the diffusion plate 126 and the reflecting plate 130 in this example. One end of the support 139 is installed on the rear surface of the diffusion plate 126, and the other end of the support 139 is installed on the reflecting plate 130 or the rear housing 102, and the support 139 supports the diffusion plate 126, and also, separates the diffusion plate 126 from the light source 142 and the reflecting plate 130.

Both side surfaces of the diffusion plate 126 may be disposed to be separated from inner surfaces of the housings 101 and 102 by a predetermined interval.

The quantum dot sheet 125 may change a color of all or a portion of incident light into a different color, and emit light, which comprises at least one of the unchanged light and the changed light. Here, the light incident onto the quantum dot sheet 125 may include light BL1 passed through the diffusion plate 126, or lights BL3 and BL5 directly transmitted from the light source 142 or the reflecting plate 130. The quantum dot sheet 125 may be interposed between the optical plate 121 and the diffusion plate 126, between the optical plate 121 and the light source 142, between the display panel 110 and the diffusion plate 126, or between the display panel 110 and the light source 142.

The quantum dot sheet 125 may change wavelengths of all or a portion of the light BL1 selectively passed through the diffusion plate 126, or all or a portion of the light BL3 or BL5 directly transmitted from the light source 142 or the reflecting plate 130, and thus, light having a color different from that of the incident light may be emitted. In order to change the color of the above light, a plurality of quantum dots are arranged in the quantum dot sheet 125.

The quantum dot refers, for example, to semiconductor crystals conglomerated and formed by hundreds to thousands of atoms. A size of the quantum dot may be, for example, in a range of several nanometers to tens of nanometers. As described above, since the size is very small, a quantum confinement effect is generated on the quantum dot. In the quantum confinement effect, when a size of a particle is very small, a non-continuous energy state is formed in electrons by an outer surface of the particle, and as the size of a space in the particle is decreased, an energy state of the electrons is increased, and an interval between energy bands is widened. According to the above quantum confinement effect, when light such as an ultraviolet, visible light, or the like is incident onto the quantum dot, light having various wavelength ranges may be generated.

The wavelength of the light generated from the quantum dot may be different from the size of the particle. In particular, when light of a wavelength having energy greater than an energy band interval is incident onto the quantum dot, the quantum dot absorbs energy of the light and is excited, and then emits light having a predetermined wavelength, and becomes a ground state. In this case, as the size of the quantum dot is small, light having a relatively short wavelength, such as blue-based light or green-based light may be generated, and as the size of the quantum dot is large, light having a relatively long wavelength, such as red-based light may be generated. Thus, based on the size of the quantum dot, lights having various colors may be realized.

In the quantum dot sheet 125, a plurality of quantum dots having different sizes may be arranged and provided. When the incident light is the blue-based light, the plurality of quantum dots may change the blue-based light into red-based light or green-based light. For example, the plurality of quantum dots may include red quantum dots 125a (shown in FIG. 13) configured to change the incident blue-based light into red-based light and emit the changed light, and green quantum dots 125b (shown in FIG. 13) configured to change the incident blue-based light into green-based light and emit the changed light. Here, a width of a particle of the red quantum dots 125a may, for example, be in a range of 5 nm to 6 nm, and a width of a particle of the green quantum dots 125b may, for example, be in a range of 2 nm to 3 nm.

When the blue-based light is incident onto the quantum dot sheet 125, a portion of the incident blue-based light passes through the quantum dot sheet 125 without change, and another portion of the incident blue-based light meets the red quantum dots 125a, and the red quantum dot 125a changes the color of the incident light and emits red-based light R, and yet another portion of the incident blue-based light meets the green quantum dots 125b, and the green quantum dots 125b change the color of the incident light and emit green-based light G. Thus, the quantum dot sheet 125 may emit all of the red-based light R, the green-based light G, and the blue-based light B. When the red quantum dots 125a and the green quantum dots 125b are properly disposed in the quantum dot sheet 125, the emitted red-based light R, the green-based light G, and the blue-based light B may be emitted at similar ratios, and the red-based light R, the green-based light G, and the blue-based light B are mixed to form a white W or a similar color thereto. Thus, the quantum dot sheet 125 may emit the white light or the light similar thereto.

The white light W or the light similar thereto which is emitted from the quantum dot sheet 125 may be emitted in a direction toward the optical plate 121.

The optical plate 121 is installed in the forward direction of the quantum dot sheet 125, and the light W emitted from the quantum dot sheet 125 is incident thereto. The light W emitted from the quantum dot sheet 125 passes through the optical plate 121, and may then be emitted in a direction toward the display panel 110.

The optical plate 121 may include, for example, one or more diffusion sheets 122, one or more prism sheets 123, and one or more protection sheets 124. The diffusion sheet 122, the prism sheet 123, and the protection sheet 124 may be realized in a film shape.

The diffusion sheet 122 may perform an operation of offsetting patterns of the diffusion plate 126. Since the light diffused by the diffusion plate 126 is directly incident onto eyes, the patterns of the diffusion plate 126 are viewed by the eyes, and thus, the diffusion sheet may offset, reduce and/or minimize the patterns of the diffusion plate 126.

The prism sheet 123 refracts the light diffused by the diffusion sheet 122, and the light is incident onto a first substrate 116 in a perpendicular direction. Prisms may be arranged on one surface of the prism sheet 123 in a predetermined pattern. In one example, the prism sheet 123 may be provided in plural number.

The protection sheet 124 may be installed in a forward direction of the diffusion sheet 122 or the prism sheet 123, and adjacent to the first polarizing filter 117. The protection sheet 124 may protect the diffusion sheet 122, the prism sheet 123, or the like from an impact or impurity of the outside.

In one example, the optical plate 121, as described above, may include the diffusion sheet 122, the prism sheet 123, and the protection sheet 124, or one or more thereof may be omitted. Also, the optical plate 121 may further include many other sheets other than the above described sheets 122 to 124. In one example, the optical plate 121 may include a combined sheet having combined functions of the above described sheets.

The light having passed through the optical plate 121 may be incident onto the display panel 110, and more particular, may be incident onto a first polarizing filter 117 of the display panel 110.

In one example, a middle housing 103 may be provided between the optical plate 121 and the first polarizing filter 117. The middle housing 103 may fix the backlight unit 120, or segregate the display panel 110 from the backlight unit 120.

The middle housing 103 may include a protrusion protruding in a direction toward the display panel 110 and the backlight unit 120, and the protrusion may perform an operation of fixing the backlight unit 120. The middle housing 103 may be integrally formed with the front housing 101 or the rear housing 102. The middle housing 103 may be omitted in one example.

Figure 6:
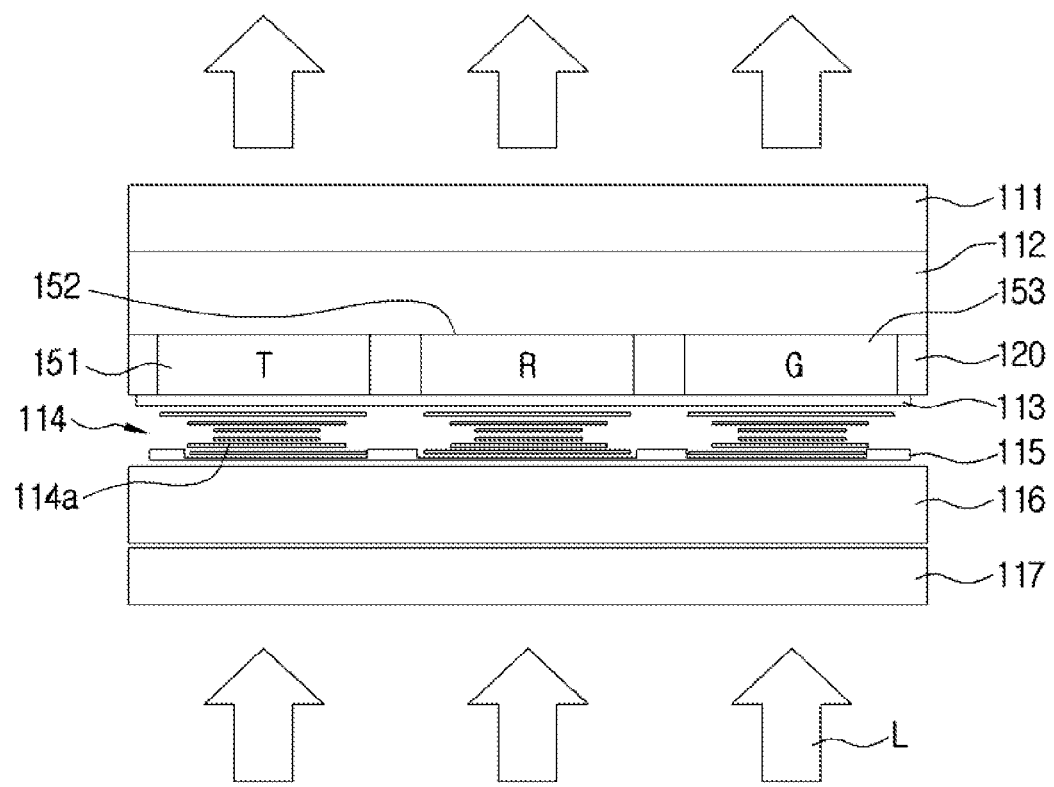
FIG. 6 is a side cross-sectional view illustrating an example display panel.

FIG. 6 is a side cross-sectional view illustrating the display panel according to one embodiment of the present invention.

Referring to FIGS. 3, 4, and 6, the display panel 110 may include a second polarizing filter 111, a second substrate 112, a color forming part 150, a second electrode 113, a first electrode 115, a first substrate 116, and a first polarizing filter 117.

The first polarizing filter 117 may polarize light incident onto the first substrate 116 from the light source 142, and only light vibrating in a direction the same as a predetermined polarizing axis may be incident onto the first substrate 116. The first polarizing filter 117 may, for example, be realized in a film shape, and may be installed, and thus, one surface in a forward direction may be in contact with or adjacent to a rear surface of the first substrate 116. In one example, the first polarizing filter 117 may include a vertical polarizing filter or a horizontal polarizing filter. Here, the vertical direction means a direction parallel with an upward or downward direction of the display device 10, and the horizontal direction means a direction parallel with a rightward or leftward direction of the display device 10.

In the first substrate 116, the first electrode 115 may be installed on one surface in the forward direction, and the first polarizing filter 117 may be installed on one surface in the rearward direction. The first substrate 116 may be formed of a transparent material, and thus, light passed through the first polarizing filter 117 in the rearward direction may pass therethrough. For example, the first substrate 116 may be formed of a synthetic resin such as acrylic or the like, or a glass or the like. In one embodiment, the first substrate 116 may include a flexible printed circuit board (FPCB).

The first electrode 115 may control an arrangement of liquid crystal molecules in a liquid crystal layer 114 by applying a current to the liquid crystal layer 114 with the second electrode 113. Based on the arrangement of the liquid crystal molecules, the display panel 110 may output various images.

In one example, the first electrode 115 may be realized using a thin film transistor (TFT). The first electrode 115 may be connected to an external power source to receive electric power. The first electrodes 115 may be installed in plural number on the first substrate 116, and the first electrodes 115 may be installed on the first substrate 116 in a predetermined pattern. The pattern in which the first electrodes 115 are disposed may be arbitrarily determined based on a selection of a designer.

The second electrode 113 may be provided to correspond to the first electrode 115 with respect to the liquid crystal layer 114, and may apply a current to the liquid crystal layer 114 with the first electrode 115. In the second electrode 113, one surface in the forward direction may be provided to be in contact with the color forming part 150, and one surface in the rearward direction may be provided to be in contact with or be adjacent to the liquid crystal layer 114. The second electrode 113 may be a common electrode.

The liquid crystal layer 114 may be provided between the second electrode 113 and the first electrode 115, and the liquid crystal layer 114 may include a plurality of liquid crystal molecules 114a.

The liquid crystal molecules 114a may be arranged in the liquid crystal layer 114 in a plurality of rows, and may be arranged in a straight line in a predetermined direction along an electric field, or arranged in a twisted spiral shape.

When the liquid crystal molecules 114a are aligned in a straight line, the light polarized by the first polarizing filter 117 may have an unchanged vibration direction and pass through the liquid crystal layer 114, and when the liquid crystal molecules 114a are arranged in the twisted spiral shape, a vibration direction of the polarized light is changed in a direction perpendicular to an original vibration direction and the polarized light passes through the liquid crystal layer 114. When the second polarizing filter 111 and the first polarizing filter 117 have different polarizing axes, light passed without a change of vibration direction may not pass through the second polarizing filter 111, and, in contrast, light passed through the liquid crystal layer 114 and polarized in the horizontal direction may pass through the second polarizing filter 111. A portion of the light having passed through the liquid crystal layer 114 may pass through the second polarizing filter 111 and be emitted to the outside, but another portion of the light may be blocked by the second polarizing filter 111 and may not be emitted to the outside.

The color forming part 150 may emit light of various colors. For example, the color forming part 150 may change incident light of a predetermined color into light of a different color or output without changing a color thereof, and thus, light of various colors may be emitted. For example, the color forming part 150 may transmit and emit blue-based light, or change and emit the blue-based light into red-based light or green-based light. By the color forming part 150, the display panel 110 may emit light of various colors to the outside, and thus, the display device 10 may display a screen of various colors.

In one example, one surface in the rearward direction of the color forming part 150 may be provided to be adjacent to the second electrode 113, and one surface in the forward direction may be provided to be installed to be in contact with the second electrode 113.

The color forming part 150 may be realized using color filters of various kinds.

The color forming part 150 may emit lights of different colors at different positions, and in this case, the lights of the different colors may be emitted at adjacent positions. By the color forming part 150, subpixels in one pixel may emit different lights. Here, the pixel may, for example, refer to a point of minimum unit forming a displayed screen, and one pixel may include one or more subpixels. For example, one pixel may include three subpixels, or four subpixels. Each of the subpixels may emit light of a predetermined color to the outside. For example, when one pixel includes three subpixels, red-based light, blue-based light, or green-based light may be emitted from each of the subpixels. When the subpixels emit the red-based light, the green-based light, and the blue-based light, respectively, and when at least one the plurality of subpixels emits light, the emitted light may be solely emitted to the outside, or mixed with light emitted from other subpixels to be emitted, and thus, red, green, blue, or various colors mixed therewith may be displayed on one pixel. When one pixel includes four subpixels, red-based light, blue-based light, green-based light, or white-based light may be emitted from each of the subpixels, lights of various colors may be displayed on one pixel by sole emission or mixture thereof.

In one example, the color forming part 150 may include organic colorants or organic pigments of various colors, and the color forming part 150 provides the incident light with colors using the organic colorants or organic pigments of the various colors, and thus, the lights of the various colors may be emitted. In this case, the color forming part 150 may be a color filter formed by coating the organic colorants or the organic pigments on one or two or more glass substrates, for example, the second substrate 112, and for example, may be formed by coating a red organic colorant, a green organic colorant, and a blue organic colorant on one or two more second substrates 112. By the red organic colorant, the green organic colorant, and the blue organic colorant, the above subpixels may emit lights of the various colors.

In another example, the color forming part 150 may emit lights of various colors using quantum dots. In this case, the color forming part 150 may include a light transmission part 151 configured to transmit blue-based light, one or more red light quantum dot units 152 configured to change incident blue light to emit red light, and one or more green light quantum dot units 153 configured to change incident blue light to emit green light. By the light transmission part 151, the red light quantum dot unit 152, and the green light quantum dot unit 153, the subpixels may emit lights of the various colors.

The light transmission part 151, the red light quantum dot unit 152, and the green light quantum dot unit 153 may be provided, as shown in FIG. 6, to correspond to liquid crystal molecules 114a of one group of the liquid crystal layers 114. In particular, the liquid crystal molecules 114a of one group are provided to correspond to the light transmission part 151, and the liquid crystal molecules 114a of another group are provided to correspond to one red light quantum dot unit 152, and the liquid crystal molecules 114a of the other group are provided to correspond to one green light quantum dot unit 153.

The light transmission part 151 does not change the incident blue-based light, and emits the blue-based light without any change. Thus, any of the subpixels may emit blue-based light B.

The red light quantum dot unit 152 may change the blue-based light radiated from the light source 142 into the red-based light using quantum dots, and emit the red-based light in a direction toward the second substrate 112. Here, the quantum dots of the red light quantum dot unit 152 are provided to be greater than those of the green light quantum dot unit 153. By the red light quantum dot unit 152, any one of the subpixels may emit red-based light R.

The green light quantum dot unit 153 may change the blue-based light radiated from the light source 142 into the green-based light using quantum dots, and emit the green-based light in the direction toward the second substrate 112. Here, the quantum dots of the green light quantum dot unit 153 are provided to be smaller than those of the red light quantum dot unit 152. By the green light quantum dot unit 153, any one of the subpixels may emit green-based light G.

The light transmission part 151, the red light quantum dot unit 152, and the green light quantum dot unit 153 may be in contact with each other, or be spaced apart from each other by a predetermined distance. When the light transmission part 151, the red light quantum dot unit 152, and the green light quantum dot unit 153 are spaced apart from each other, a partition wall may be provided therebetween.

The light transmission part 151, the red light quantum dot unit 152, and the green light quantum dot unit 153 may have equal areas, or different areas from each other. Also, the light transmission parts 151, the red light quantum dot units 152, and the green light quantum dot units 153 may be disposed in the color forming part 150 at the same level, or at different levels. For example, the red light quantum dot units 152 and the green light quantum dot units 153 may be disposed to be more than the light transmission parts 151.

The light having passed through the color forming part 150 is incident onto the second substrate 112.

The second substrate 112 is provided, and the color forming part 150 is formed on one surface in a rearward direction, and the second polarizing filter 111 is formed on one surface in a forward direction.

In one example, a red organic colorant, a green organic colorant, and a blue organic colorant may be coated or printed on the second substrate 112 in a predetermined pattern, or a red organic pigment, a green organic pigment, and a blue organic pigment may be coated or printed in a predetermined pattern.

In another example, on the second substrate 112, a red light quantum dot unit, a green light quantum dot unit, and a light transmission part may be installed in a predetermined pattern.

The second substrate 112 may be embodied using a transparent material, and the red-based light, the green-based light, and the blue-based light emitted from the color forming part 150 may pass therethrough, and for example, may be manufactured using a synthetic resin such as an acrylic resin, or glasses of various kinds.

The second polarizing filter 111 may be installed on one surface in the forward direction of the second substrate 112, and polarize the incident light. The light passed through the second substrate 112 and emitted therefrom, for example, the red-based light, the green-based light, and the blue-based light, may be incident onto the second polarizing filter 111, and based on a vibration direction, may pass through the second polarizing filter 111 or be blocked by the second polarizing filter 111.

A polarizing axis of the second polarizing filter 111 may be provided to be perpendicular to that of the first polarizing filter 117, and thus, when the first polarizing filter 117 is a vertical polarizing filter, the second polarizing filter 111 may be a horizontal polarizing filter.

When the polarizing axis of the second polarizing filter 111 is perpendicular to that of the first polarizing filter 117 and the liquid crystal molecules 114a of the liquid crystal layer 114 are aligned in a straight line to transmit the light having passed through the first polarizing filter 117, since a vibration direction of the light passed through the first polarizing filter is not changed, the light may not pass through the second polarizing filter 111, and thus, the light passed through the second substrate 112 may not be emitted toward the outside. In contrast, when the liquid crystal molecules 114a of the liquid crystal layer 114 are aligned in a spiral shape and pass through the first polarizing filter 117, since the vibration direction of the light having passed through the first polarizing filter 117 is changed, the light may pass through the second polarizing filter 111, and thus, the light having passed through the second substrate 112, for example, at least one of the red-based light, the green-based light, and the blue-based light, may be emitted toward the outside.

Since at least one of the red-based light, the green-based light, and the blue-based light is combined or not-combined during the emission toward the outside, a predetermined color is formed, and the display device 10 may display a predetermined image using at least one of the red-based light, the green-based light, and the blue-based light.

As described above, the example of the display device 10 is described, but various types of components other than the above described components may be added by requirement. For example, a fourth substrate, on which various types of components configured to control overall operations such as light radiation of the light source 142 of the display device 10, may be further provided. Here, the various types of components, for example, may include a processor or a storage device realized by one or two or more semiconductor chips, various circuits, or various types of components configured to support the operation of the processor. The fourth substrate may be installed on various positions, for example, the fourth substrate may be fixedly installed inside the rear housing 102. Other than the above, various types of components which may be considered by a designer may be provided on the display device 10. Also, in one example, components such as a touch screen panel, or the like may be further added to the display device 10.

Hereinafter, a reflecting plate will be described in detail.

Figure 7:
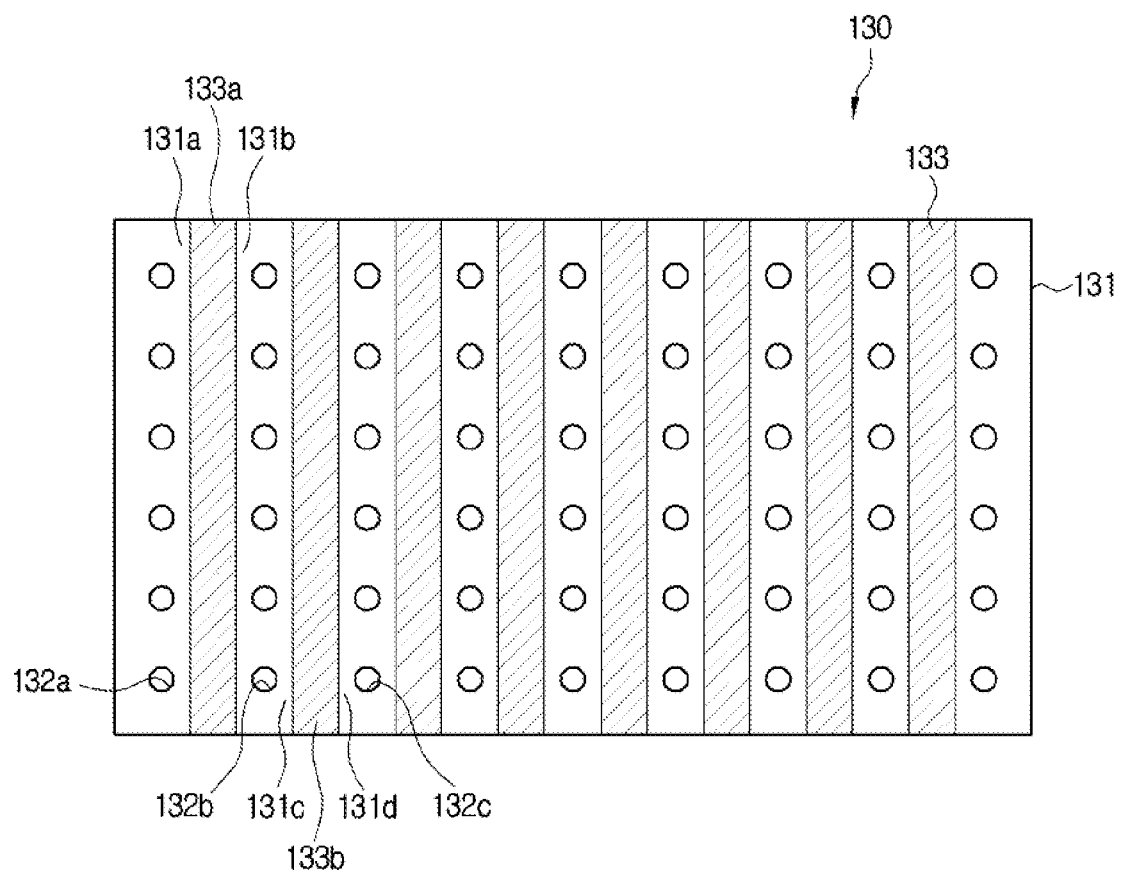
FIG. 7 is a plan view illustrating an example reflecting plate on which a selective light absorbing part is disposed.
Figure 8:
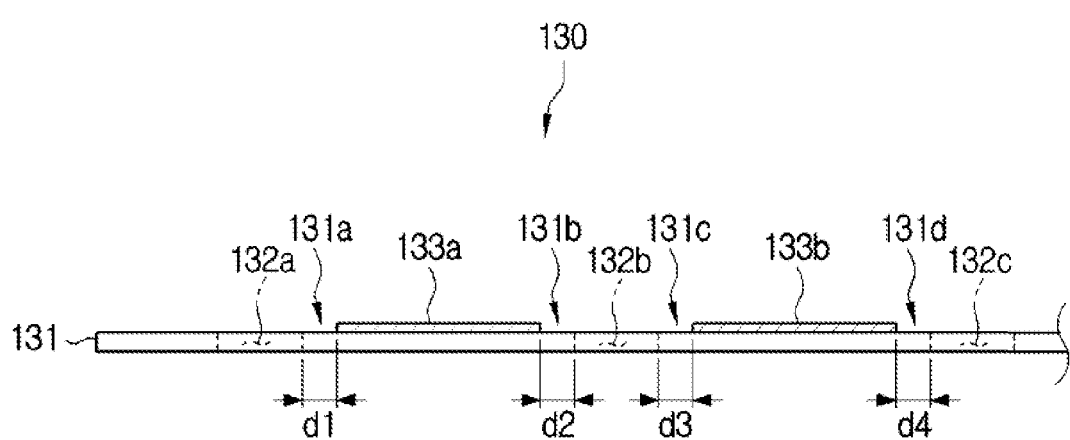
FIG. 8 is a side cross-sectional view illustrating an example reflecting plate on which the selective light absorbing part is disposed.
Figure 9:
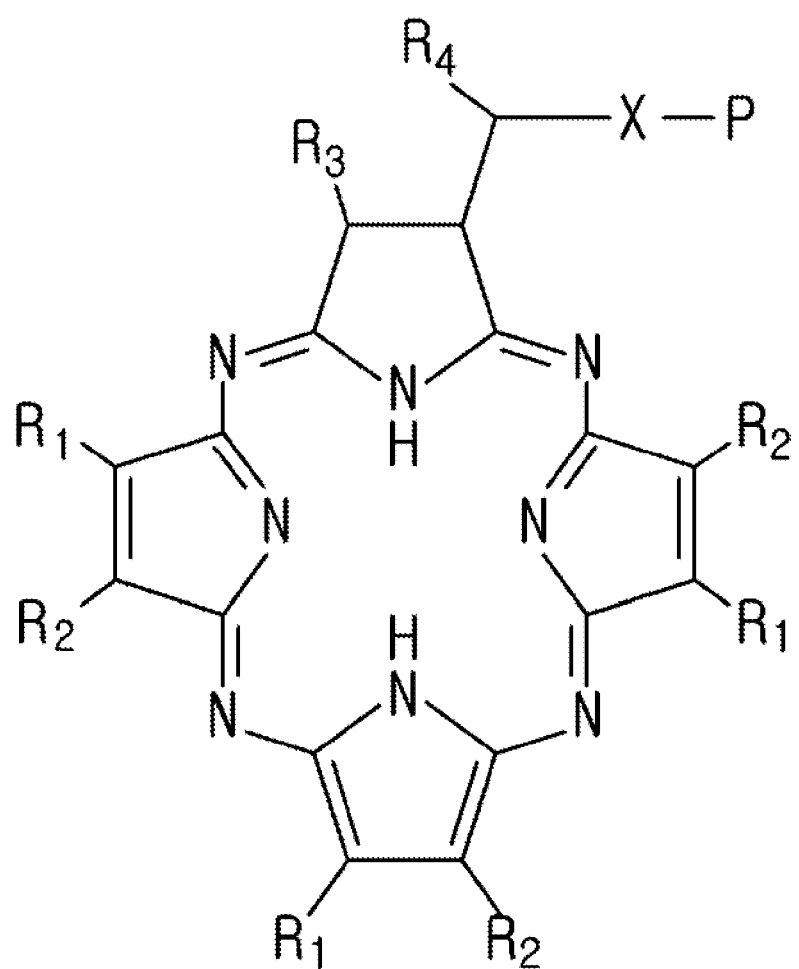
FIG. 9 is a view illustrating an example of a structural formula of tetra-aza-porphyrin (TAP) capable of being used in the selective light absorbing part.
Figure 10:
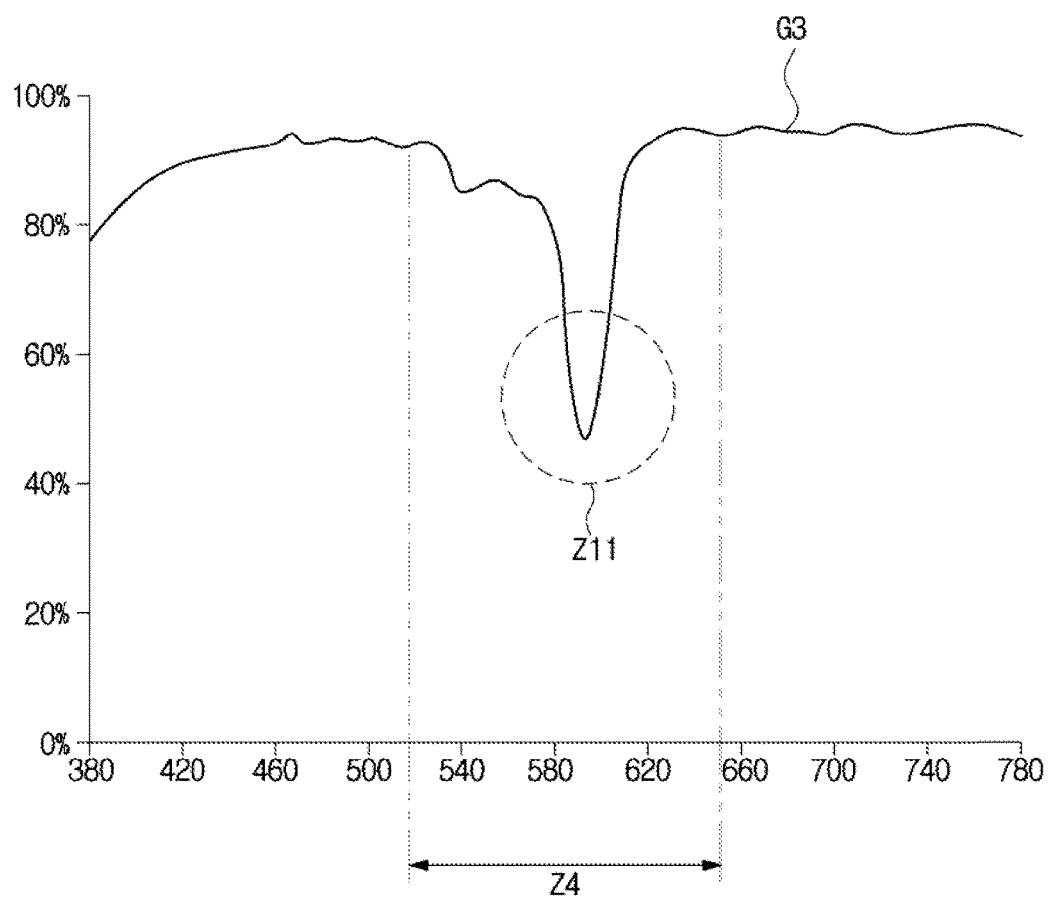
FIG. 10 is a graph illustrating an absorption rate of blue-based light by the selective light absorbing part.

FIG. 7 is a plan view illustrating an example reflecting plate on which a selective light absorbing part is disposed, and FIG. 8 is a side cross-sectional view illustrating the example reflecting plate on which the selective light absorbing part is disposed. FIG. 9 is a view illustrating an example of a structural formula of TAP capable of using in the selective light absorbing part, and FIG. 10 is a graph illustrating an absorption rate of blue-based light by the selective light absorbing part. FIG. 10 illustrates the absorption rate in the case of using TAP as the selective light absorbing part, where the Y-axis means the absorption rate, and the X-axis means a wavelength.

As shown in FIGS. 7 and 8, the reflecting plate 130 may include a reflecting plate main body 131 forming an overall shape of the reflecting plate 130 and a selective light absorbing part 133 formed on a reflecting surface of the reflecting plate main body 131.

The reflecting plate main body 131 may reflect light incident from the light source, and one surface thereof in the forward direction forms a reflecting plate. In one example, through-holes 132a to 132c, in which the light source 142 is installed, may be provided on the reflecting plate main body 131. As described above, the through-holes 132a to 132c may be omitted based on a method of installing the light source 142.

The selective light absorbing part 133 may be installed on the reflecting surface of the reflecting plate main body 131. The selective light absorbing part 133 may selectively absorb light of a certain wavelength range of the incident light, and transmit light of another wavelength range. The light passed through the selective light absorbing part 133 may arrive at or be reflected from the reflecting surface of the reflecting plate main body 131.

The selective light absorbing part 133 may be formed of one or more compounds, and may be installed on the reflecting surface of the reflecting plate main body 131 by, for example, attaching a film including a predetermined compound to the reflecting surface, or printing or coating colorants or pigments including a predetermined compound on the reflecting surface.

The predetermined compound may be a material which mainly absorbs light of a predetermined wavelength range from incident light and absorbs less of, does not absorb or nearly non-absorbs light of another wavelength range. Here, the predetermined wavelength range may be in a range of 570 nm to 610 nm. In other words, the predetermined compound may mainly absorb the light of a certain wavelength range of 570 nm to 610 nm. For example, the predetermined compound may mainly absorb the light of the wavelength range of 580 nm to 600 nm, and absorb only a portion of, or nearly not absorb, light of a different wavelength range.

The selective light absorbing part 133 may be realized using TAP.

The TAP may be referred to as porphyrazine, and tetrapyrrole macrocycle similar to porphyrin, or the like. As shown in FIG. 9, TAP includes a plurality of nitrogen atoms N, hydrogen atoms H, bases R1 and R2, one or more metal atoms X, and phosphorus P. TAP may absorb light of a predetermined wavelength using the metal atom X or an additional functional group.

For example, when at least one of copper, chromium, vanadium, and molybdenum is used as the metal atom X of TAP, as shown in FIG. 10, a portion having a wavelength portion of 570 nm to 610 nm may be remarkably more absorbed than a different wavelength portion Z11. The light having the wavelength range of 570 nm to 610 nm includes yellow-based light, yellowish red-based light of, or orange-based light, and when one or more metal atoms among copper, chromium, vanadium, and molybdenum are used as the metal atom, TAP mainly absorbs more of the blue-based light, the yellowish red-based light, or the orange-based light. Meanwhile, TAP nearly does not absorb or partially absorbs light of a different wavelength other than the above. Thus, the light of the different wavelengths from the wavelength range of 570 nm to 610 nm is generally not absorbed by TAP, but passes therethrough.

Thus, when TAP is used as the selective light absorbing part 133, and when the light is incident onto the selective light absorbing part 133, a wavelength of yellow group, a wavelength of yellowish red group, or a wavelength of orange group is relatively reduced, and thus, the selective light absorbing part 133 emits light having increased a portion of the different wavelength.

The selective light absorbing part 133 may be installed on the entire reflecting surface of the reflecting plate main body 131, or installed only on a portion thereof.

When the selective light absorbing part 133 is installed on the entire reflecting plate main body 131, the light emitted from the light source 142 arrives at the reflecting surface after passing through the selective light absorbing part 133, and is reflected from the reflecting surface in a direction toward the quantum dot sheet 125.

When the selective light absorbing part 133 is installed only on a portion of the reflecting plate main body 131, the portion of the light emitted from the light source 142 arrives at the reflecting surface after passing through the selective light absorbing part 133, and another portion thereof directly arrives at the reflecting surface. When the selective light absorbing part 133 is installed only on the portion of the reflecting plate main body 131, the selective light absorbing part 133 may be installed on the reflecting surface of the reflecting plate main body 131 in various methods based on selection of a designer. In this case, the selective light absorbing part 133 may be installed by coating, printing, or attaching onto the reflecting surface of the reflecting plate main body 131 in a predetermined pattern. The selective light absorbing part 133 may be arranged in a linear pattern or a nonlinear pattern.

The selective light absorbing part 133 may be installed on a periphery of the through-hole 132. In this case, the selective light absorbing part 133 may be installed to be in contact with the through-hole 132. Also, the selective light absorbing part 133 may be installed to be spaced apart from the through-hole 132 by a predetermined distance. In this case, between the selective light absorbing part 133 and the through-hole 132, a surface from which the light is reflected without the selective light absorbing part 133 is formed.

Also, the selective light absorbing part 133 may be disposed on an interface of the reflecting plate main body 131. In this case, the selective light absorbing part 133 may be disposed along the interface of the reflecting plate main body 131 in a predetermined pattern or continuously.

The selective light absorbing part 133 may have various shapes such as a point, a line, a plane, or a figure based on selection of a designer, and the point may, for example, have a circular shape, an elliptical shape, a water-drop shape, a polygonal shape, or the like. Other than the above, the selective light absorbing part 133 may have any shape considered by the designer.

According to the first example of the reflecting plate 130, the selective light absorbing part 133, as shown in FIGS. 7 and 8, may have a thin band shape, for example, an extended straight band shape, or may have a curved band shape of which all or a portion is bent. A plurality of selective light absorbing parts 133a and 133b having a band shape may be provided on a plurality of reflecting plates 130.

The selective light absorbing parts 133a and 133b having a band shape may extend and be formed in a longitudinal direction from one end to the other end of the reflecting plate main body 131. Also, the selective light absorbing parts 133a and 133b having a band shape may not be formed to extend from the one end to the other end of the reflecting plate main body 131, and may be formed only on a portion of a straight line extending from the one end to the other end of the reflecting plate main body 131.

The selective light absorbing parts 133a and 133b having a band shape may have a constant width, and the width of the selective light absorbing parts 133a and 133b having a band shape may be determined based on a distance between the through-holes 132a and 132b or a distance between the through-holes 132b and 132c, or may be determined regardless of the distance between the through-holes 132a and 132b or the distance between the through-holes 132b and 132c.

In one example, the selective light absorbing parts 133a and 133b having a band shape may be disposed between at least two through-holes 132a and 132b or the through-holes 132b and 132c. In this case, the interface portion of the selective light absorbing parts 133a and 133b may be spaced apart from the two through-holes 132a and 132b or the through-holes 132b and 132c by a predetermined distance dl to d4. Thus, between the selective light absorbing parts 133a and 133b and the through-holes 132a and 132b or between the selective light absorbing parts 133a and 133b and the through-holes 132b and 132c, a surface 131a to 131d from which the light may be reflected without the selective light absorbing parts 133a and 133b may exist.

In FIGS. 7 and 8, the example, in which the selective light absorbing parts 133a and 133b having the plurality of band shapes are disposed in upward and downward directions, is illustrated, but the selective light absorbing part 133a having the plurality of band shapes may also be disposed in leftward and rightward directions.

Figure 11:
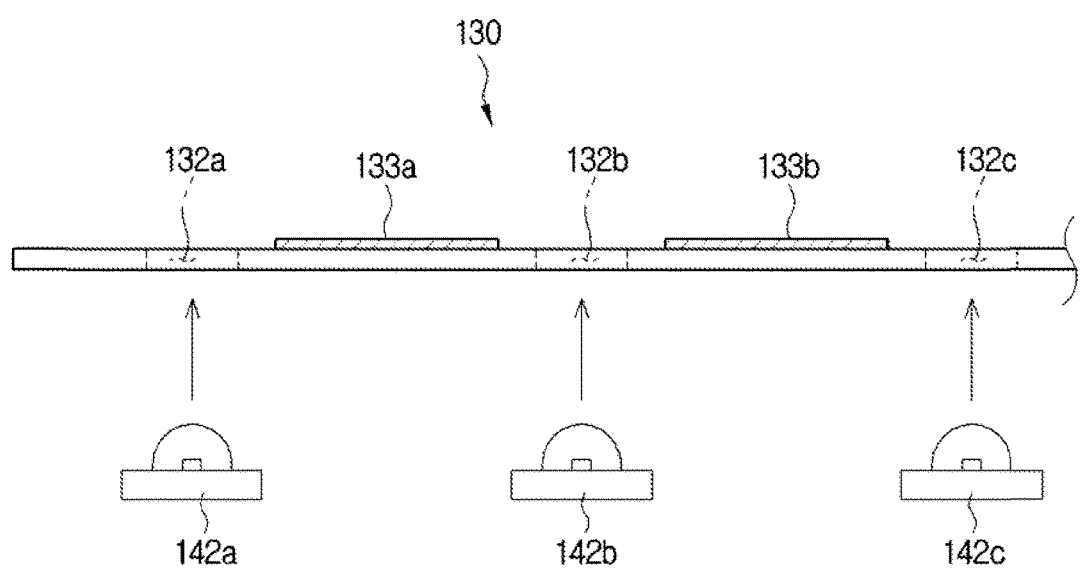
FIG. 11 is a view illustrating an example structure in which a light source is mounted on a reflecting plate.
Figure 12:
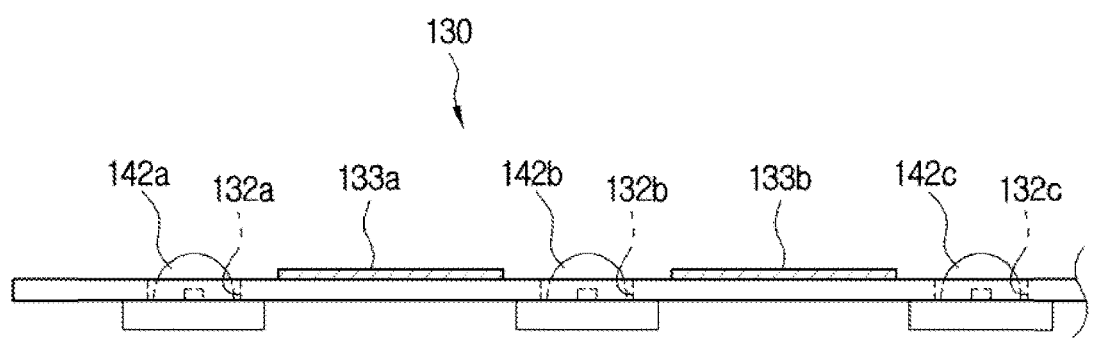
FIG. 12 is a side cross-sectional view illustrating an example reflecting plate on which a light source is provided.
Figure 13:
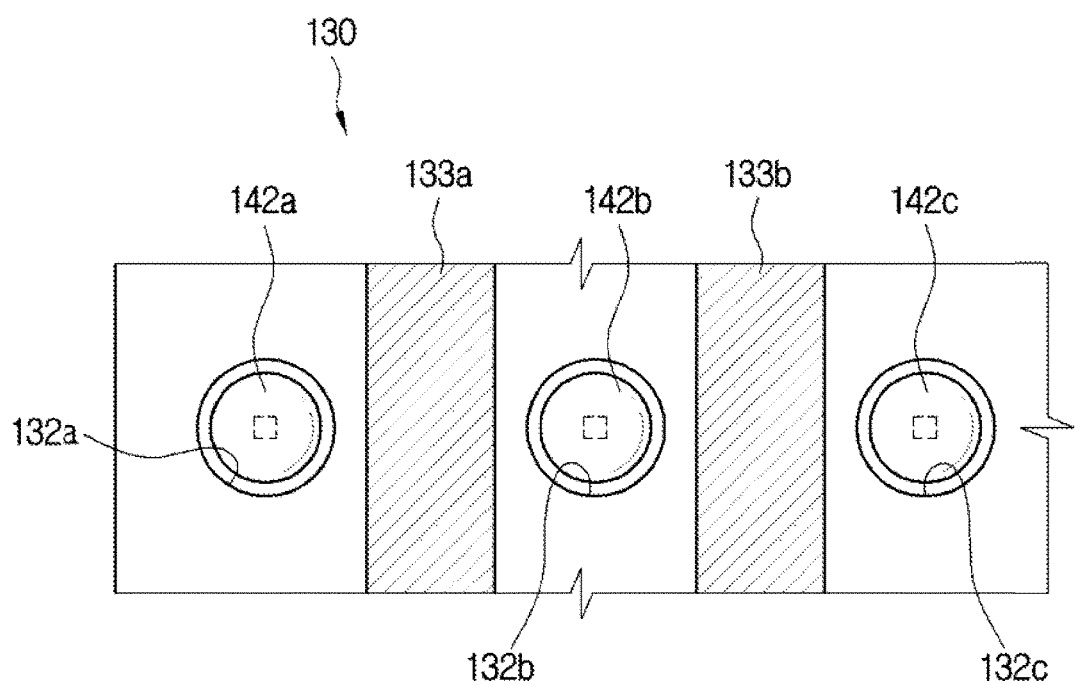
FIG. 13 is a plan view illustrating an example reflecting plate on which a light source is provided.

FIG. 11 is a view illustrating an example structure in which a light source is mounted on a reflecting plate, and FIG. 12 is a side cross-sectional view illustrating an example reflecting plate on which a light source is provided, and FIG. 13 is a plan view illustrating an example reflecting plate on which a light source is provided.

As shown in FIGS. 11 to 13, a plurality of light sources 142a to 142c are inserted into the through-holes 132a to 132c respectively corresponding thereto in an opposite direction to the reflecting surface, and after passing through the reflecting plate 130, the plurality of light sources 142a to 142c may be installed to be exposed in a direction toward the reflecting surface of the reflecting plate main body 131. As described above, since the selective light absorbing parts 133a and 133b having the plurality of band shapes are disposed between the plurality of through-holes 132a and 132b or between the through-holes 132b and 132c, the selective light absorbing parts 133a and 133b having the plurality of the same band shapes pass between the plurality of through-holes 132a and 132b or the through-holes 132b and 132c and are disposed between the plurality of light sources 142a, 142b, and 142c. Thus, when light of a predetermined color, for example, blue-based light, is emitted from the light sources 142a, 142b, and 142c, a portion of the light emitted from the light sources 142a, 142b, and 142c arrives at the selective light absorbing parts 133a and 133b having the plurality of band shapes, and after the portion of the light is selectively absorbed by the selective light absorbing parts 133a and 133b, and then, a remaining light is reflected from the reflecting surface, and is transmitted in the forward direction.

A process of generating or not generating color mura based on an existence of the selective light absorbing part 133 will be described below.

Figure 14:
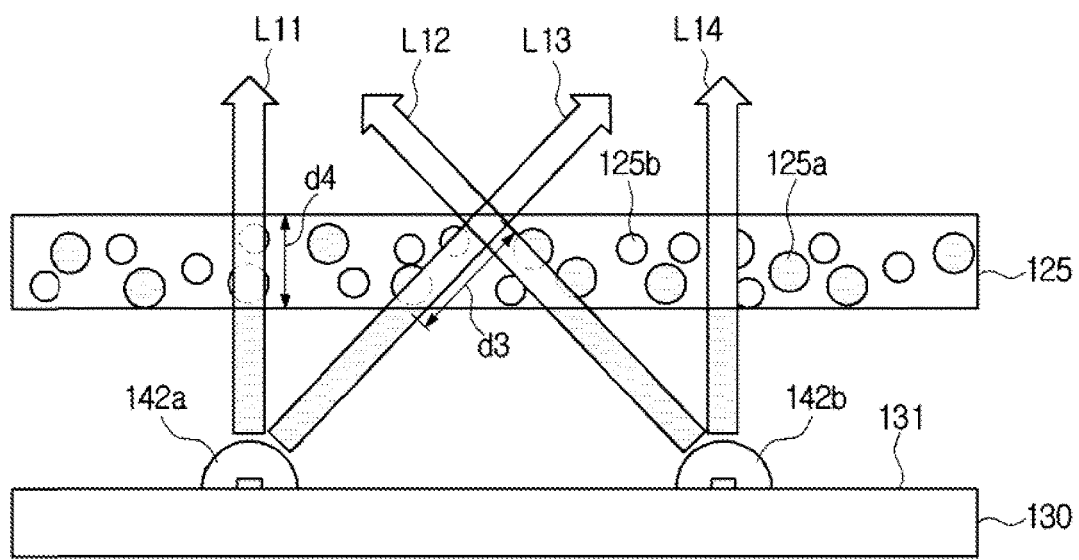
FIG. 14 is a view illustrating an example process in which light incident from a light source passes through a quantum dot sheet and is emitted to a display panel.
Figure 15:
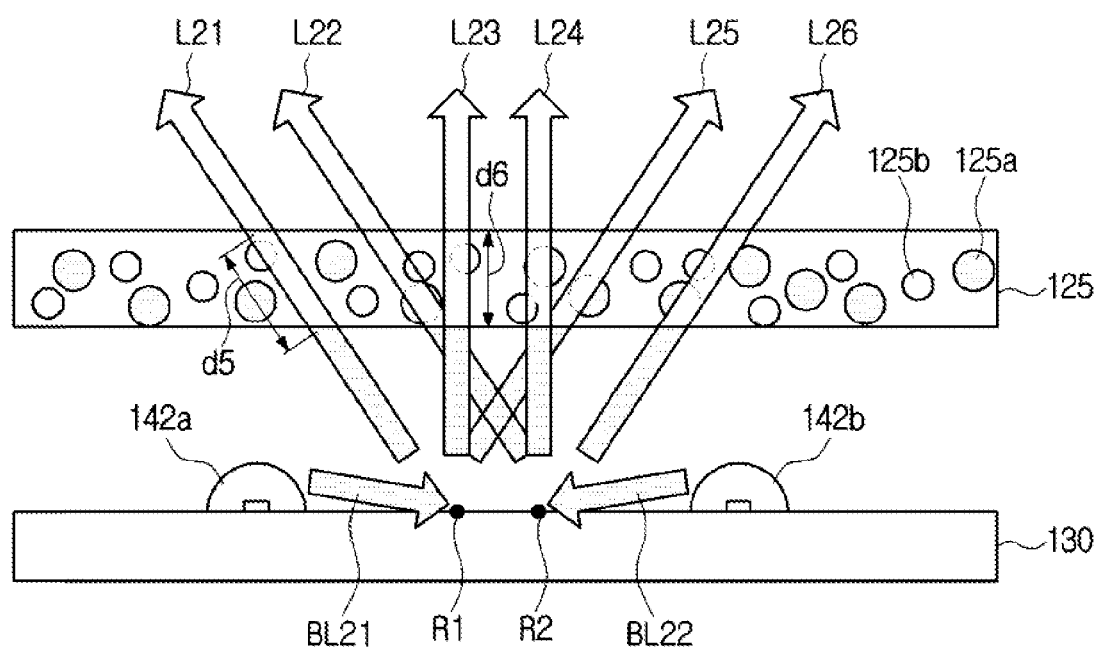
FIG. 15 is a view illustrating an example path through which light incident from a light source passes through a display panel and is emitted to the outside when a selective light absorbing part is omitted.
Figure 16:
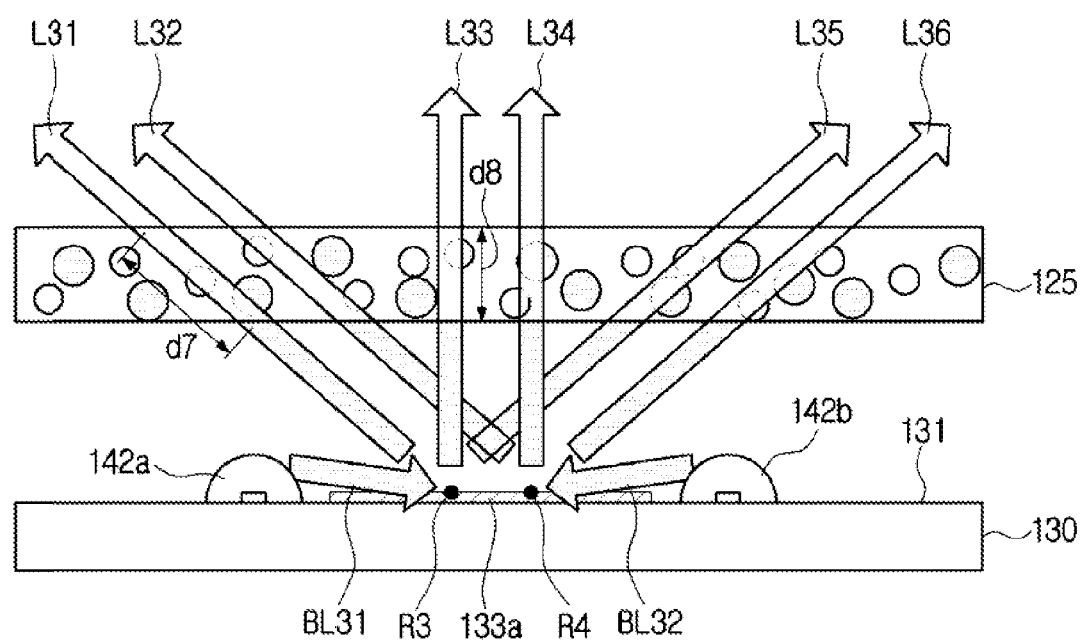
FIG. 16 is a view illustrating an example path through which light incident from a light source passes through a display panel and is emitted to the outside when a selective light absorbing part exists in more detail.

FIG. 14 is a view illustrating an example process in which light incident from a light source passes a quantum dot sheet and is emitted to a display panel, and FIG. 15 is a view illustrating an example path through which light incident from a light source passes a display panel and is emitted to the outside when a selective light absorbing part is omitted, and FIG. 16 is a view illustrating an example path through which light incident from a light source passes a display panel and is emitted to the outside when a selective light absorbing part exists in more detail. In FIGS. 14 to 16, for convenience of description, discussion of the reflecting plate 130 is omitted.

As shown in FIGS. 14 to 16, light emitted from the light sources 142a and 142b is directly incident onto a quantum dot sheet 125 (L11 to L14), or is reflected from one or more points R1 and R2 of a reflecting surface and is incident into the quantum dot sheet 125 (L21 to L26), or passes through a selective light absorbing part 133 and is reflected from one or more points R3 and R4 of the reflecting surface, and then, is incident onto the quantum dot sheet 125 (L31 to L36). The lights L11 to L14, L21 to L26, and L31 to L36 incident onto the quantum dot sheet 125, as described above, pass through the quantum dot sheet 125, and a color may be changed or not changed.

As shown in FIG. 14, when the lights L11 to L14 emitted from the light sources 142a and 142b are directly incident onto the quantum dot sheet 125, since the light sources 142a and 142b diffuse and emit the lights L11 to L14 in a constant range, some lights, such as, for example, L11 and L14 may be incident onto the quantum dot sheet 125 in a vertical direction or in a direction similar thereto, and some other lights, such as, for example, L12 and L13 may be incident onto the quantum dot sheet 125 in an oblique direction. In this case, the lights L11 and L14 incident in the vertical direction or in the direction similar thereto pass through the quantum dot sheet 125 by a distance shorter than the lights L12 and L13 incident in the oblique direction. For example, a distance d3 at which the light L12 and L13 incident in the oblique direction pass through the quantum dot sheet 125 may be greater than a distance d4 at which the lights L11 and L14 incident in the vertical direction or the direction similar thereto pass through the quantum dot sheet 125. In other words, a path difference is formed between the incident lights L11 and L14 and the incident lights L12 and L13. Thus, the lights L12 and L13 incident in the oblique direction meet the quantum dots 125a and 125b at a probability greater than the lights L11 and L14 incident in the vertical direction and the direction similar thereto, and thus, the lights L12 and L13 incident in the oblique direction and having changed colors into red-based or green-based light by the quantum dots 125a and 125b may be greater in amount than the lights L11 and L14 incident in the vertical direction or the direction similar thereto and having changed colors into red-based or green-based light. As a result, the lights L12 and L13 incident in the oblique direction, which have passed though the quantum dot sheet 125 and are emitted, may have a relatively smaller amount of the blue-based light than the lights L11 and L14 incident in the vertical direction or the direction similar thereto, which have passed through the quantum dot sheet 125 and are emitted.

Meanwhile, as shown in FIG. 15, some lights BL21 and BL22 among the lights emitted from the light sources 142a and 142b reach the reflecting surface of the reflecting plate 130, and proceed in a direction toward the quantum dot sheet 125. In this case, some lights BL21 and BL22, for example, may be reflected from one or more points R1 and R2 of the reflecting surface.

The lights L21 to L26 reflected from the reflecting surface proceed in various directions by diffused reflection on the reflecting surface. Thus, some lights, such as, for example, L23 and L24 among the lights L21 to L26 reflected from the reflecting surface may be incident onto the quantum dot sheet 125 in the vertical direction or the direction similar thereto, and also, other lights, such as, for example, L21, L22, L25, and L26 may be incident in the oblique direction. As described above, the lights L23 and L24 incident in the vertical direction or the direction similar thereto pass through the quantum dot sheet 125 at a distance smaller than the lights L21, L22, L25, and L26 incident in the oblique direction. In other words, a distance d5 at which the lights L21, L22, L25, and L26 incident in the oblique direction pass through the quantum dot sheet 125 may be greater than a distance d6 at which the lights L23 and L24 incident in the vertical direction or the direction similar thereto pass through the quantum dot sheet 125. Thus, the lights L21, L22, L25, and L26 incident in the oblique direction meet the quantum dots 125a and 125b at a probability greater than the lights L23 and L24 in the vertical direction or the direction similar thereto, and thus, the red-based light or green-based light may be emitted at a relatively greater amount. Thus, the blue-based light may be displayed relatively smaller than the light having passed through the quantum dot sheet 125 and emitted, and since an amount of the red-based and green-based light is greater than an amount of the blue-based light, the light emitted from the quantum dot sheet 125 includes the yellow-based light or the yellowish red-based light. As described above, the yellow-based light or the yellowish red-based light may generate color mura on a screen displayed by the display device 10.

As shown in FIG. 16, when the selective light absorbing part 133a exists on the reflecting surface of the reflecting plate 130, some lights BL31 and B32 emitted from the light sources 142a and 142b pass through the selective light absorbing part 133a, and reflected from some points R3 and R4 of the reflecting surface, and then, the lights L31 to L36 proceed in a direction toward the quantum dot sheet 125. Also, in this case, another portion of the light emitted from the light sources 142a and 142b, as shown in FIG. 15, does not pass through the selective light absorbing part 133a, but is directly reflected from the reflecting surface and proceed in the direction toward the quantum dot sheet 125.

As described above, the selective light absorbing part 133a absorbs relatively more light of a predetermined wavelength from the incident light, and does not absorb light of different wavelengths, or absorbs only a portion thereof. Thus, light which does not pass through the selective light absorbing part 133a as shown in FIG. 15, but is different from the lights L21 to L26 reflected from the reflecting surface is incident onto the rear surface of the quantum dot sheet 125.

Figure 17:
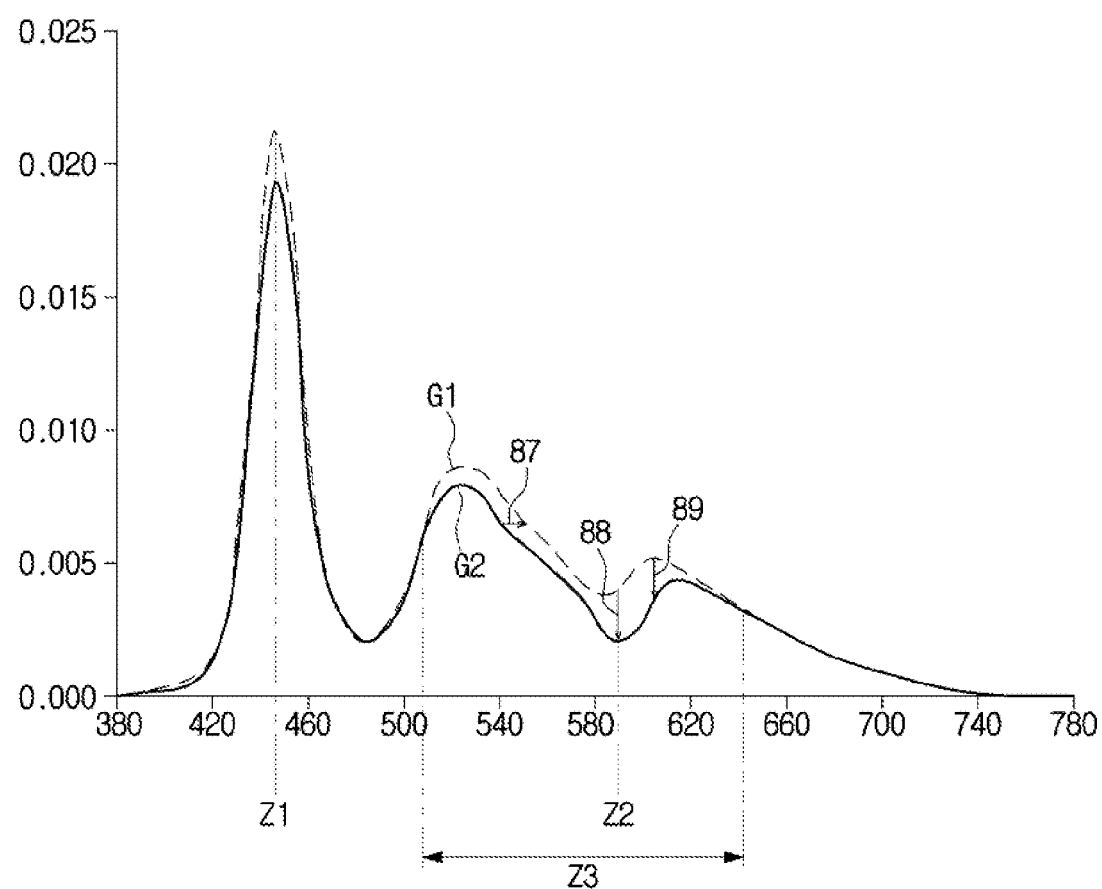
FIG. 17 is a graph illustrating a spectrum distribution of visible light emitted from a backlight unit when a selective light absorbing part exists or is omitted.

FIG. 17 is a graph illustrating an example spectrum distribution of visible light emitted from a backlight unit when a selective light absorbing part exists or is omitted. In FIG. 17, a first curve G1 illustrates a spectrum distribution of the light emitted from the light source 142, and a second curve G2 illustrates a spectrum distribution of the light absorbed in the selective light absorbing part 133 and then emitted. In FIG. 17, the Y-axis represents an intensity of light, and the X-axis represents a wavelength of light.

For example, when a blue light emitting diode is used as the light source 142a and 142b, referring to the first curve G1 of FIG. 17, in the light sources 142a and 142b, an intensity of light corresponding to blue light (a portion of which wavelength is in a range of about 430 nm to 460 nm) is relatively greater than an intensity of light corresponding to red light (a portion of which wavelength is in a range of about 600 nm to 650 nm) or an intensity of light corresponding to green light (a portion of which wavelength is in a range of about 510 nm to 550 nm). Thus, the light emitted from the light sources 142a and 142b are displayed as a blue color.

When the light emitted from the light source 142a and 142b arrives at the selective light absorbing part 133a, the selective light absorbing part 133a absorbs the light as shown in FIG. 10, and absorbs relatively more a specific range of light Z11. Referring to the second curve G2 of FIG. 17, in the light passed through the selective light absorbing part 133a, light of some wavelengths is absorbed by the selective light absorbing part 133a, and thus, the light intensity of a particular portion Z3, for example, portions 87 to 89 having a wavelength in a range of about 570 nm to 610 nm is relatively weak. Thus, in the selective light absorbing part 133a, the light having weak intensity which corresponds to the particular portion Z3 is emitted. For example, when the selective light absorbing part 133a is realized using TAP, at the selective light absorbing part 133a, light having a weak yellow, yellowish red, or orange color and a strong blue color is emitted.

The light having passed through the selective light absorbing part 133a is reflected from the reflecting surface. In this case, the lights L31 to L36 reflected from the reflecting surface proceed in various directions by various reasons such as diffused reflection on the reflecting surface, or the like. Thus, as described above, some lights L33 and L34 among the lights L31 to L36 reflected from the reflecting surface are incident onto the quantum dot sheet 125 in the vertical direction or the direction similar thereto, and lights L31, L32, L35, and L36 of another portion are incident in the oblique direction. The lights L31, L32, L35, and L36 incident in the oblique direction pass through the quantum dot sheet 125 at distances d7 and d8 longer than the lights L33 and L34 incident in the vertical direction or the direction similar thereto. Thus, the lights L31, L32, L35, and L36 incident in the oblique direction meet the quantum dots 125a and 125b at a probability greater than the lights L33 and L34 incident in the vertical direction or the direction similar thereto.

However, unlike the description of FIG. 15, since the lights L31 to L36 incident onto the quantum dot sheet 125 have relative low intensity at the particular portion Z3, for example, intensity of yellow-based, yellowish red-based, or orange-based light is low, although the lights L31, L32, L35, and L36 incident in the oblique direction meet red light quantum dots 125a or green light quantum dots 125b more frequently, the light emitted from the quantum dot sheet 125 of FIG. 16 has relatively more reduction in the red group and the green group than the light emitted from the quantum dot sheet of FIG. 15. Thus, in the light emitted from the quantum dot sheet 125, the yellow-based light or the yellowish red-based light do not exist, or exist to a lesser extent. Thus, color mura which may be generated when the selective light absorbing part 133a is reduced or may be blocked or decreased based on the existence of the selective light absorbing part 133a.

Figure 18:
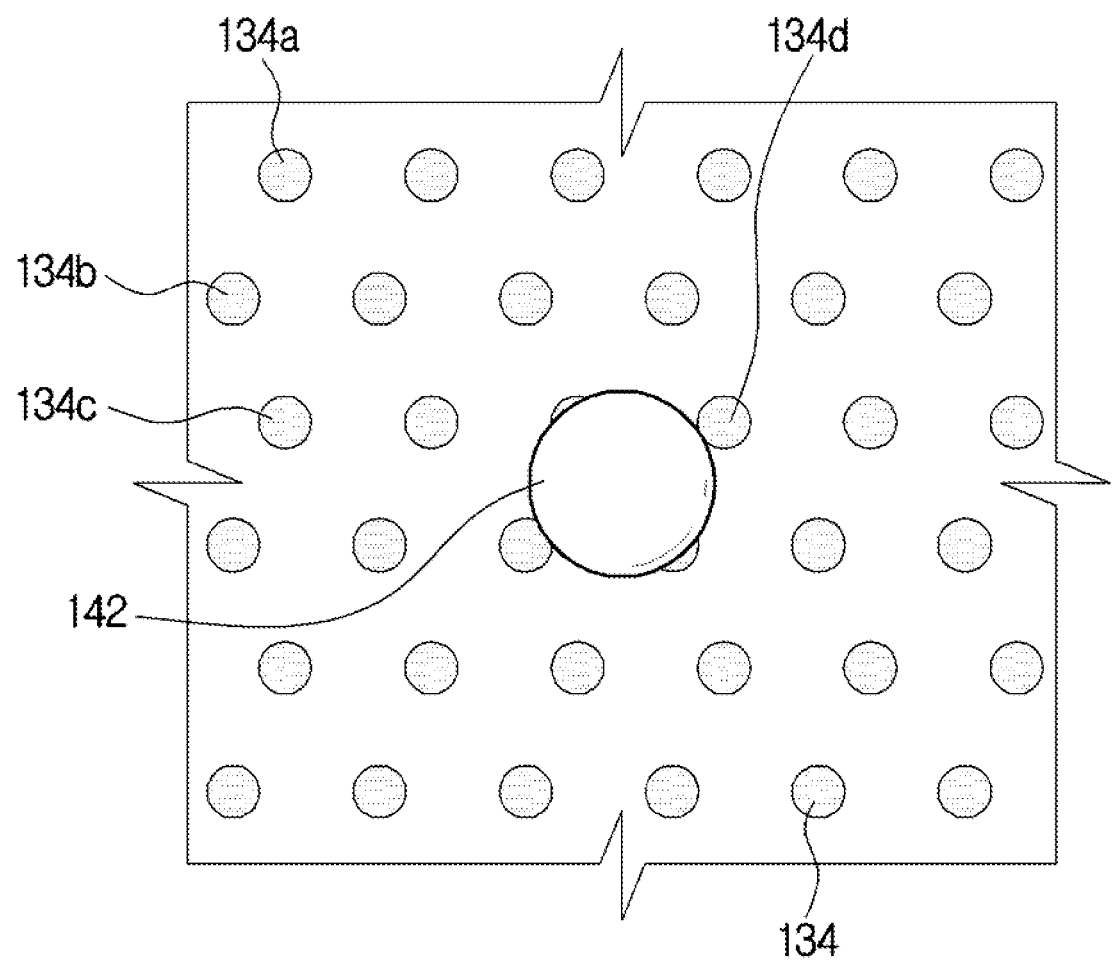
FIG. 18 is a plan view illustrating an example reflecting plate on which a selective light absorbing part is disposed.

FIG. 18 is a plan view illustrating an example reflecting plate on which a selective light absorbing part is disposed.

Referring to FIG. 18, selective light absorbing parts 134a to 134d may have a circular shape, and may be disposed on a reflecting surface adjacent to a light source 142 in a predetermined pattern. For example, the selective light absorbing parts 134a to 134d of the circular shape may be arranged in a straight line adjacent to the light source 142, and may be arranged in a zigzag shape as shown in FIG. 18.

Other than the above, the selective light absorbing parts 134a to 134d may be arranged in various patterns which may be considered by a designer.

In this case, the selective light absorbing parts 134a to 134d may have various shapes other than the circular shape. For example, the selective light absorbing parts 134a to 134d may have an elliptical shape, a water-drop shape, a polygonal shape, or the like. Other than the above, the selective light absorbing parts 134a to 134d may have various shapes which may be considered by a designer.

Figure 19:
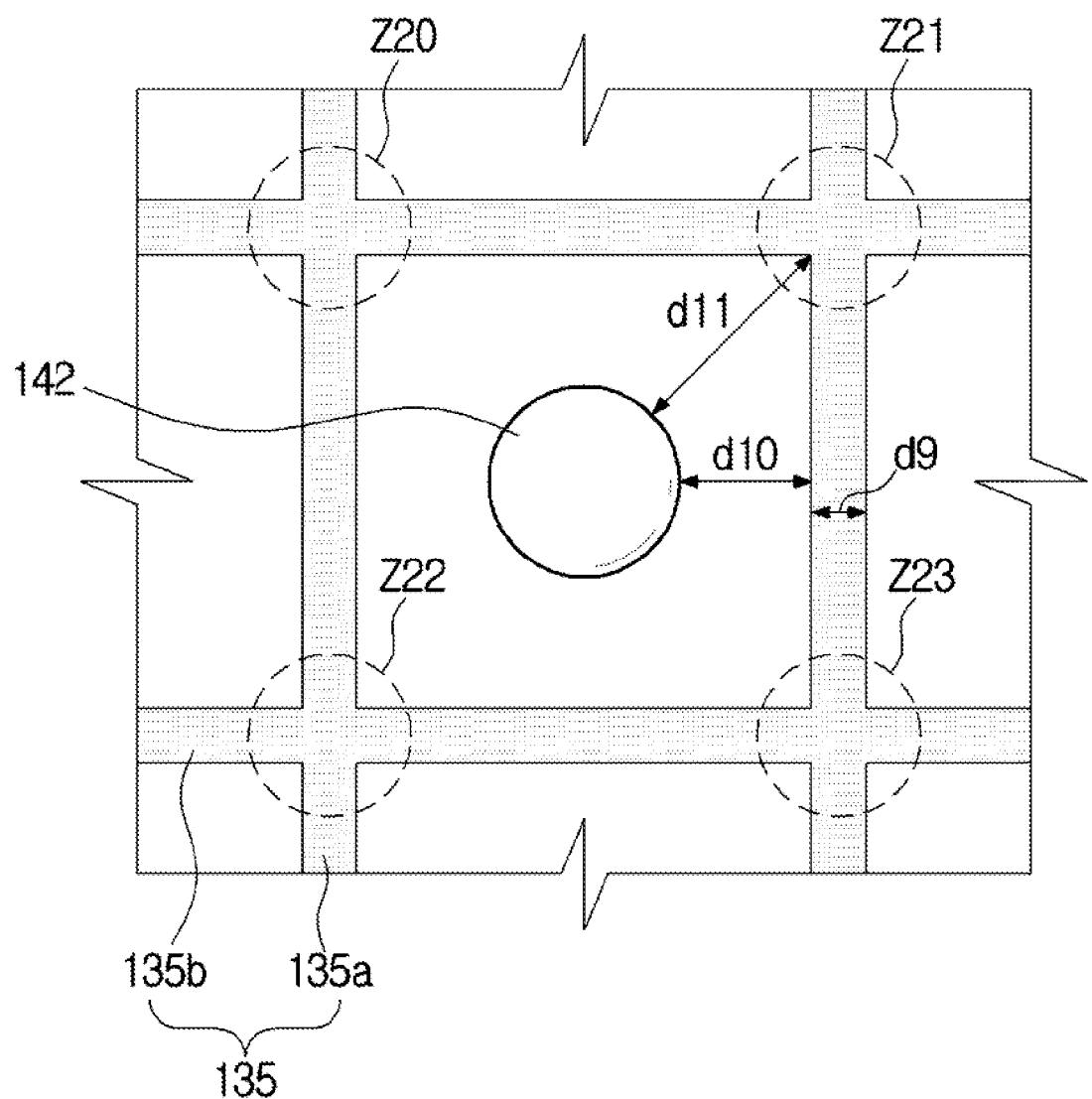
FIG. 19 is a plan view illustrating an example reflecting plate on which a selective light absorbing part is disposed.

FIG. 19 is a plan view illustrating an example reflecting plate on which a selective light absorbing part is disposed.

Referring to FIG. 19, the selective light absorbing part 135 may include a first selective light absorbing part 135a and a second selective light absorbing part 135b. The first selective light absorbing part 135a and the second selective light absorbing part 135b may have a straight band shape or a curved band shape of a predetermined width d9. The first selective light absorbing part 135a of the band shape extends in upward and downward directions and is formed on a reflecting plate main body 131, and the second selective light absorbing part 135b of the band shape extends in leftward and rightward directions and is formed on the reflecting plate main body 131. The first selective light absorbing part 135a of the band shape and the second selective light absorbing part 135b of the band shape may be provided to cross at predetermined points Z20 to Z23, and in this case, the first selective light absorbing part 135a of the band shape and the second selective light absorbing part 135b of the band shape may cross each other at a right angle. When the first selective light absorbing part 135a having a plurality of band shapes and the second selective light absorbing part 135b having a plurality of band shapes are provided, the first selective light absorbing part 135a and the second selective light absorbing part 135b may cross at various points Z20 to Z23, and the first selective light absorbing part 135a having a plurality of band shapes and the second selective light absorbing part 135b having a plurality of band shapes may be provided on the reflecting surface to surround one or more light sources 142.

The first selective light absorbing part 135a and the second selective light absorbing part 135b may be provided to be spaced apart from the light source 142 by predetermined distances d10 and d11. Thus, a portion of light emitted from the light source 142 directly arrives at and is reflected from the reflecting surface of the reflecting plate 130, and another portion of the light arrives at any one of the first selective light absorbing part 135a and the second selective light absorbing part 135b. In the light arriving at any one of the first selective light absorbing part 135a and the second selective light absorbing part 135b, light of some wavelengths is absorbed by the first selective light absorbing part 135a and the second selective light absorbing part 135b, and reflected from the reflecting surface on which the first selective light absorbing part 135a and the second selective light absorbing part 135b are installed.

A distance d11 between a point Z21 at which the first selective light absorbing part 135a and the second selective light absorbing part 135b cross each other and the light source 142 may be provided to be longer than a distance d10 between the first selective light absorbing part 135a and the light source 142 or between the second selective light absorbing part 135b and the light source 142.

Figure 20:
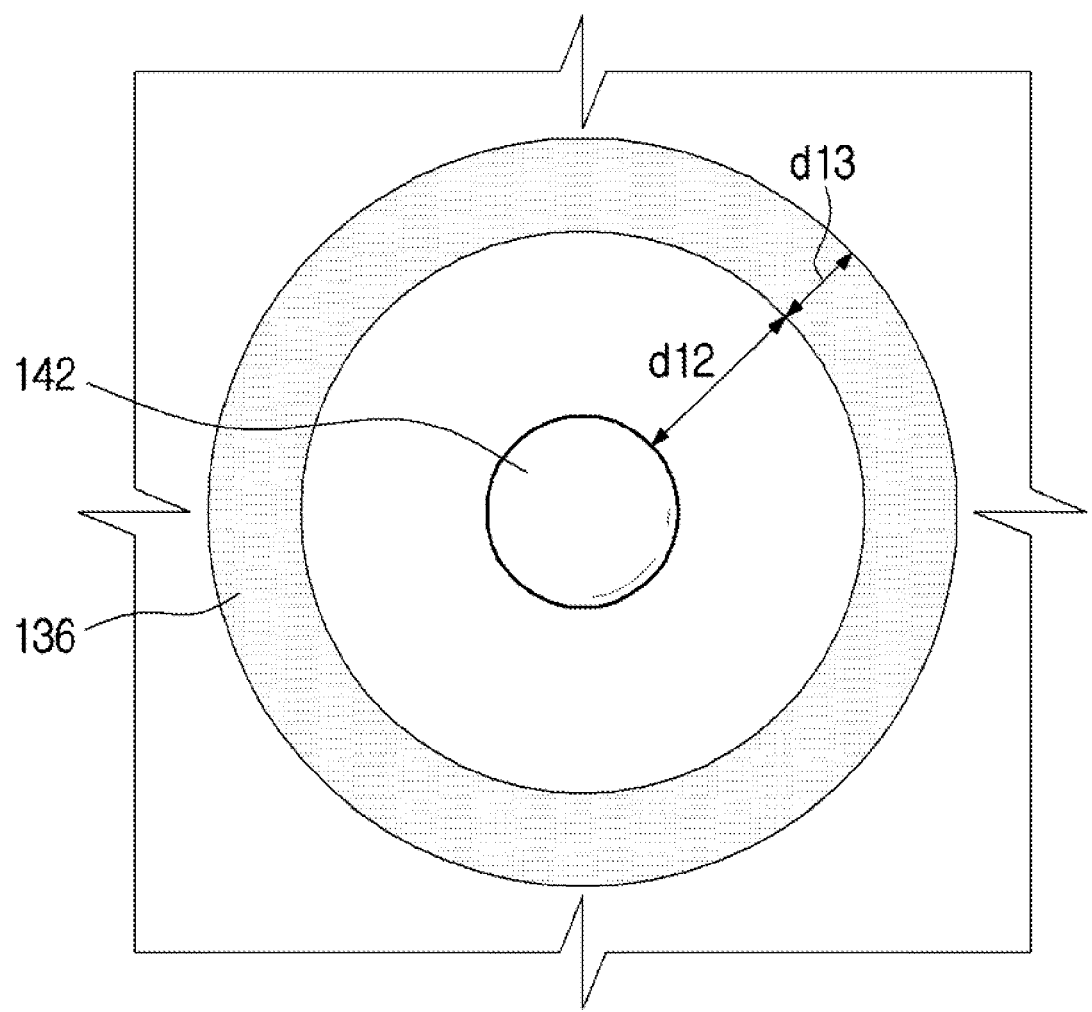
FIG. 20 is a plan view illustrating an example reflecting plate on which a selective light absorbing part is disposed.

FIG. 20 is a plan view illustrating an example reflecting plate on which a selective light absorbing part is disposed.

As shown in FIG. 20, a selective light absorbing part 136 may have a circular band shape or elliptical band shape having a predetermined width d13. In this case, the selective light absorbing part 136 of the circular band shape or elliptical band shape may be provided to surround one or more light sources 142. For example, one or more light sources 142 may be disposed in an empty space in the selective light absorbing part 136 of the circular band shape.

An inner boundary of the circular band may be spaced apart from the light source 142 by a predetermined distance d12, and thus, a portion of the light emitted from the light source 142 may directly arrive at and be reflected from a reflecting surface of a reflecting plate 130. Another portion of the light may arrive at a selective light absorbing part 136 of the circular band shape or the elliptical band shape, and light of a particular wavelength is absorbed and reflected, and then, emitted in a direction toward a quantum dot sheet 125.

As is apparent from the above description, according to the reflecting plate, the backlight unit, and the display device, when light is projected onto a display panel using a quantum dot (QD) sheet, the generation of mura on a display screen output from a display panel can be reduced, minimized and/or prevented.

According to the above reflecting plate, the backlight unit, and the display device, when blue light radiated from a light source is reflected from the reflecting plate, since the blue light is relatively less reflected from a portion of the reflecting plate, yellow mura caused on a screen can be reduced, minimized and/or prevented.

According to the above reflecting plate, the backlight unit, and the display device, all types of mura which may be generated by direct/indirect reflection of light radiated from the light source or polarization typed reflection, etc., of other sheets of the display device can be improved.

According to the reflecting plate, the backlight unit, and the display device, since mura generated on a screen is reduced, minimized and/or prevented, the display device can output a screen of suitable colors.

Although a number of examples of the disclosure have been illustrated and described, it will be appreciated by those skilled in the art that changes may be made in these examples without departing from the principles and spirit of the disclosure, the scope of which is defined in the claims and their equivalents.

What is claimed is:
1. A display device comprising:
   a plurality of light sources;
   a reflecting plate onto which light radiated from the plurality of light sources is incident and having a reflecting surface configured to reflect the incident light, wherein the plurality of light sources are positioned in a plurality of rows on the reflecting plate;
   a plurality of selective light absorbing parts disposed on the reflecting surface of the reflecting plate, and configured to selectively absorb a portion of the incident light; and
   a quantum dot sheet into which at least one of light emitted without being absorbed by the selective light absorbing part and the light radiated from the light sources is incident,
   wherein the selective light absorbing parts are disposed between two light sources among the plurality of light sources.
2. The display device of claim 1, wherein the plurality of selective light absorbing parts comprise one or more compounds, wherein the one or more compounds absorb yellow-based light or yellowish red-based light.

3. The display device of claim 1, wherein the plurality of selective light absorbing parts comprise tetra-aza-porphyrin (TAP).

4. The display device of claim 3, wherein the plurality of selective light absorbing parts absorb relatively more light in a wavelength range from 570 nm to 610 nm.

5. The display device of claim 1, wherein the plurality of selective light absorbing parts are disposed on the reflecting surface of the reflecting plate by coating, printing, or attaching onto the reflecting surface of the reflecting plate.

6. The display device of claim 1, wherein the plurality of selective light absorbing parts are disposed on all or a portion of the reflecting surface of the reflecting plate.

7. The display device of claim 1, wherein the plurality of selective light absorbing parts are arranged on the reflecting surface of the reflecting plate in a predefined pattern.

8. The display device of claim 7, wherein the plurality of selective light absorbing parts are disposed adjacent to the one or more light sources.

9. The display device of claim 8, wherein the plurality of selective light absorbing parts are arranged to surround one or more light sources and are disposed on the reflecting surface of the reflecting plate.

10. The display device of claim 9, wherein the plurality of selective light absorbing parts include at least one of a circular band shape and an elliptical band shape, wherein the one or more light sources are disposed on an inner side of the selective light absorbing parts.

11. The display device of claim 7, wherein the plurality of selective light absorbing parts are disposed between the one or more light sources.

12. The display device of claim 11, wherein the plurality of selective light absorbing parts include at least one of a straight band shape and a curved band shape disposed between the one or more light sources.

13. The display device of claim 7, wherein the plurality of selective light absorbing parts comprise:
first selective light absorbing parts including at least one of a straight band shape and a curved band shape; and
second selective light absorbing parts including at least one of a straight band shape and a curved band shape.

14. The display device of claim 13, wherein the first selective light absorbing parts and the second selective light absorbing parts are disposed to cross each other on the reflecting surface of the reflecting plate.

15. The display device of claim 7, wherein the plurality of selective light absorbing parts are arranged on the reflecting surface of the reflecting plate in at least one of a straight line and a zigzag shape.

16. The display device of claim 15, wherein the plurality of light absorbing parts include at least one of a circular shape, an elliptical shape, a water-drop shape, and a polygonal shape.

17. The display device of claim 1, wherein the reflecting plate comprises one or more through-holes into which the one or more light sources are inserted, wherein the one or more light sources are exposed.

18. The display device of claim 1, wherein the one or more light sources include a blue light emitting diode configured to emit blue-based light.

19. The display device of claim 1, wherein the quantum dot sheet changes a color of a portion of the incident light and emits the portion of the incident light, and does not change a color of a remaining portion and emits the remaining portion.

20. The display device of claim 19, wherein the quantum dot sheet mixes and emits the light having a changed color and the light having an unchanged color to emit white-based light.

21. The display device of claim 19, further comprising a display panel onto which the light emitted from the quantum dot sheet is incident, wherein the display panel generates an image using the incident light.

22. A backlight unit comprising:
a plurality of light sources;
a reflecting plate onto which light radiated from the plurality of light sources is incident and having a reflecting surface reflecting the incident light, wherein the plurality of light sources are positioned in a plurality of rows on the reflecting plate;
a plurality of selective light absorbing parts disposed on the reflecting surface of the reflecting plate, and configured to selectively absorb a portion of the incident light; and
a quantum dot sheet including one surface into which at least one of light emitted without being absorbed by the selective light absorbing part and the light radiated from the light source is incident, and configured to emit light of a predetermined color based on the incident light,
wherein the selective light absorbing parts are disposed between two light sources among the plurality of light sources.

23. The backlight unit of claim 22, wherein the one or more selective light absorbing parts comprise one or more compounds, wherein the one or more compounds absorb yellow-based light or yellowish red-based light.

24. The backlight unit of claim 23, wherein the one or more selective light absorbing parts comprise TAP.

* * * * *